United States Patent
Seki

(10) Patent No.: US 8,742,742 B2
(45) Date of Patent: Jun. 3, 2014

(54) SWITCHING CONTROL CIRCUIT FOR FIXED-ON-TIME POWER CONVERSION SYSTEM

(75) Inventor: Masao Seki, Gunma-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 265 days.

(21) Appl. No.: 13/313,090

(22) Filed: Dec. 7, 2011

(65) Prior Publication Data

US 2012/0146609 A1 Jun. 14, 2012

(30) Foreign Application Priority Data

Dec. 14, 2010 (JP) .................................. 2010-278426

(51) Int. Cl.
| | |
|---|---|
| G05F 1/56 | (2006.01) |
| G05F 1/565 | (2006.01) |
| G05F 1/575 | (2006.01) |
| G05F 1/595 | (2006.01) |

(52) U.S. Cl.
USPC ............................ 323/284; 323/285; 323/312

(58) Field of Classification Search
USPC .......... 323/266, 282–286, 288–290, 311–317
See application file for complete search history.

(56) References Cited

U.S. PATENT DOCUMENTS

| | | | | |
|---|---|---|---|---|
| 3,162,801 | A * | 12/1964 | Bogotch et al. ............... | 323/293 |
| 4,001,702 | A * | 1/1977 | Kaufman ....................... | 329/340 |
| 6,177,787 | B1 * | 1/2001 | Hobrecht ...................... | 323/283 |
| 7,019,504 | B2 * | 3/2006 | Pullen et al. .................. | 323/283 |
| 7,425,819 | B2 * | 9/2008 | Isobe ............................. | 323/222 |
| 7,501,804 | B2 * | 3/2009 | Vo ................................. | 323/282 |
| 8,159,204 | B2 * | 4/2012 | Grant ............................ | 323/285 |
| 8,169,205 | B2 * | 5/2012 | Chen et al. .................... | 323/282 |
| 2009/0289612 | A1 * | 11/2009 | Hojo et al. .................... | 323/290 |
| 2010/0225292 | A1 * | 9/2010 | Nishimori et al. ............ | 323/288 |
| 2011/0025283 | A1 * | 2/2011 | Futamura ....................... | 323/282 |

FOREIGN PATENT DOCUMENTS

JP 2004-104942 A 4/2004

OTHER PUBLICATIONS

Patent Abstract for Japanese Publication No. 2004-104942 Published Apr. 2, 2004 (1 page).

\* cited by examiner

*Primary Examiner* — Adolf Berhane
*Assistant Examiner* — Nusrat Quddus
(74) *Attorney, Agent, or Firm* — Polansky & Associates P.L.L.C.; Paul J. Polansky

(57) ABSTRACT

A switching-control circuit configured to keep a transistor on for a predetermined time to generate a target-level-output-voltage from an input voltage. The circuit is configured to generate, every switching period of the transistor, a slope voltage corresponding to that of a ripple voltage contained in an output voltage during a time period when the transistor is off, limit an amplitude of the slope voltage so as not to exceed a predetermined amplitude greater than the amplitude of the slope voltage when the target-level-output-voltage is generated, add the slope voltage to a reference voltage, indicating a reference of the target-level-output-voltage, or a feedback voltage corresponding to the output voltage, and keep the transistor on for a predetermined time and thereafter turn off the transistor, when a level of either one voltage, added with the slope voltage, of the reference voltage and the feedback voltage reaches a level of another voltage thereof.

20 Claims, 18 Drawing Sheets

SWITCHING CONTROL CIRCUIT FOR FIXED-ON-TIME POWER CONVERSION SYSTEM

CROSS-REFERENCE TO RELATED APPLICATION

This application claims the benefit of priority to Japanese Patent Application No. 2010-278426, filed Dec. 14, 2010, of which full contents are incorporated herein by reference.

BACKGROUND OF THE INVENTION

1. Field of the Invention

The present invention relates to a switching control circuit.

2. Description of the Related Art

With respect to a switching power supply circuit configured to generate an output voltage of a target level from an input voltage, a power supply circuit of a type called a ripple converter or a hysteresis control regulator (see, e.g., Japanese Laid-Open Patent Publication No. 2004-104942) is known. FIG. 19 depicts one example of a ripple converter 300 of a common fixed-on-time system. When a feedback voltage Vfb corresponding to an output voltage Vout decreases to be lower than a reference voltage Vref, a control circuit 410 turns on an NMOS transistor 420 for a predetermined time. As a result, the output voltage Vout increases. When the output voltage Vout is decreased by an effect of a load and the feedback voltage Vref becomes lower than the reference voltage Vref, the control circuit 410 again turns on the NMOS transistor 420 for the predetermined time. Such an operation is repeated, thereby generating the output voltage Vout of the target level.

In the ripple converter 300, a ceramic capacitor 440 with smaller ESR (Equivalent Series Resistance) is occasionally employed to reduce a ripple voltage of an output voltage Vout. In such a case, since the ripple voltage contained in the feedback voltage Vfb is reduced, which may leads to unstable operation of the ripple converter 300. Thus, in order to operate the ripple converter 300 in a stable manner, an adjusting circuit (not shown) is used that is configured to adjust a gain and a phase of the feedback voltage Vfb and a circuit (not shown) that is configured to generate the ripple voltage based on a current applied to the inductor 430 to be added to the feedback voltage Vfb, for example (see Japanese Laid-Open Patent Publication No. 2004-104942).

However, for example, if the ripple voltage is added to the feedback voltage Vfb so as to operate the ripple converter 300 in a steady manner, the output voltage Vout may significantly change from a target level when a load condition changes in a transient manner or under no-load condition, for example.

Specifically, as illustrated in FIG. 20, if a load condition is changed from a heavy load to a light load at time t100, the output voltage Vout is overshot, thereby rapidly increasing the feedback voltage Vfb as well. For example, if the ripple voltage is not added to the feedback voltage Vfb, the feedback voltage Vfb slowly decreases at time t100 and thereafter, as indicated by a dashed line. Since the NMOS transistor 420 is not turned on until the feedback voltage Vfb reaches the reference voltage Vref, the output voltage Vout also slowly decreases as indicated by a dashed line.

On the other hand, if the ripple voltage is added to the feedback voltage Vfb, the feedback voltage Vfb rapidly decreases as indicated by a solid line. When the feedback voltage Vfb reaches the reference voltage Vref at time t101, the NMOS transistor 420 is turned on. That is to say, in this case, the NMOS transistor 420 is turned on, even though the output voltage Vout is at a level higher than the target level. Thus, such a problem occurs that the output voltage Vout significantly deviates from the target level.

SUMMARY OF THE INVENTION

A switching control circuit according to an aspect of the present invention, which is configured to control a switching operation of a transistor so that the transistor is turned on and kept on for a predetermined time in order to generate an output voltage of a target level from an input voltage, the transistor having an input electrode applied with the input voltage and an output electrode connected to a load via an inductor, the switching control circuit includes: a voltage generating circuit configured to generate a slope voltage in each switching period of the transistor, the slope voltage changing with a slope corresponding to a slope of a ripple voltage, the ripple voltage contained in the output voltage during a time period during which the transistor is off; an amplitude limiting circuit configured to limit an amplitude of the slope voltage so as not to exceed a predetermined amplitude, the predetermined amplitude being greater than the amplitude of the slope voltage when the output voltage of the target level is generated; an adding circuit configured to add the slope voltage to a reference voltage or a feedback voltage, the reference voltage indicating a reference of the output voltage of the target level, the feedback voltage corresponding to the output voltage; and a drive circuit configured to turn on the transistor to be kept on for a predetermined time and thereafter turn off the transistor, when a level of either one voltage, added with the slope voltage, of the reference voltage and the feedback voltage reaches a level of an other voltage thereof.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

First Embodiment

Figure 1:
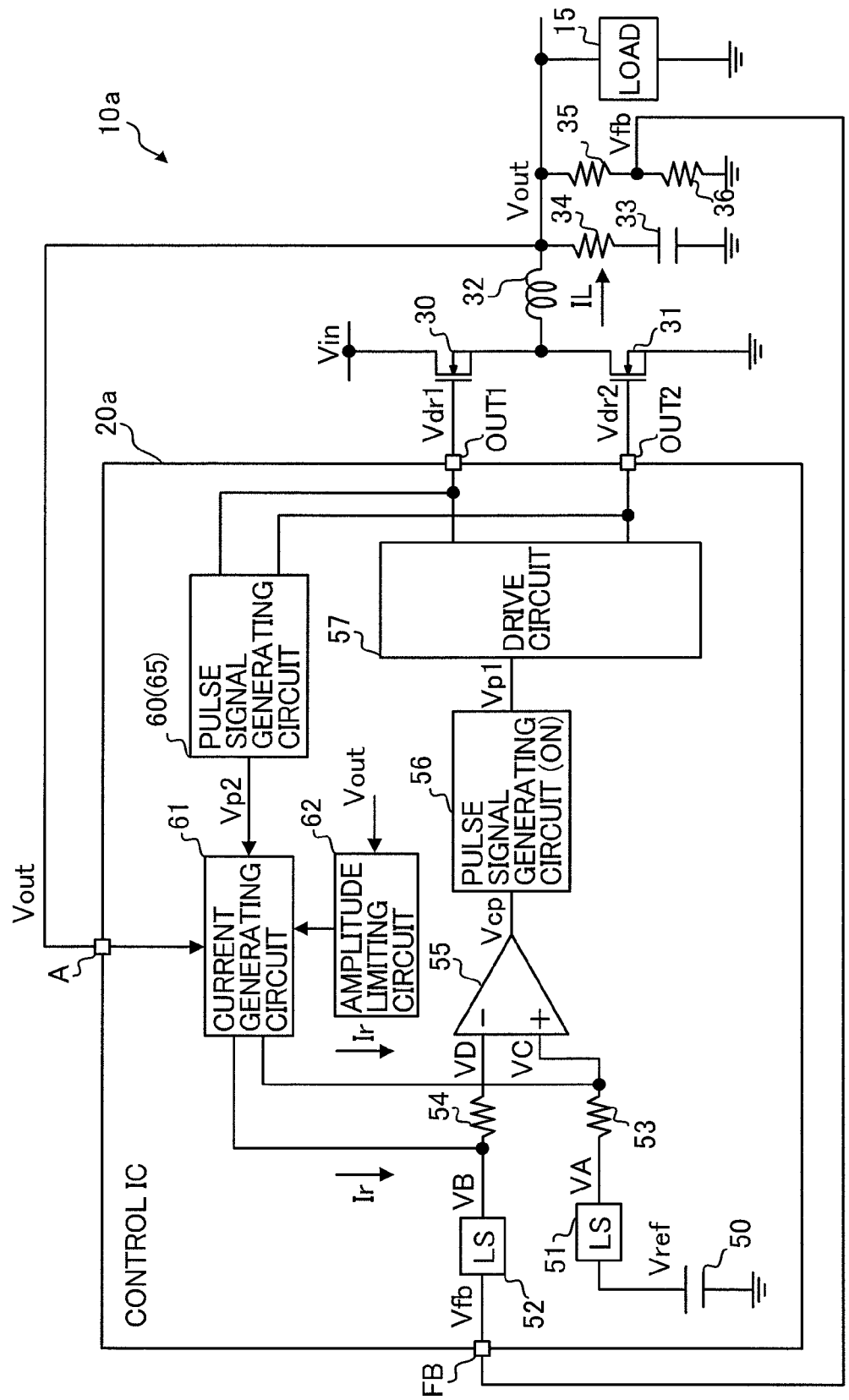
FIG. 1 is a diagram illustrating a configuration of a ripple converter 10a according to a first embodiment of the present invention.

FIG. 1 depicts a configuration of a ripple converter 10a of a fixed-on-time system according to a first embodiment of the present invention. The ripple converter 10a is a circuit configured to generate an output voltage Vout of a target level from an input voltage Vin, for example, and includes a control IC (Integrated Circuit) 20a, NMOS transistors 30 and 31, an inductor 32, a capacitor 33, and resistors 34 to 36. In the ripple converter 10a, in order that the ripple converter 10a is operated in a stable manner, a slope voltage Vs, which changes with the slope corresponding to the level of the output voltage Vout, is added to a reference voltage Vref.

A load 15 is an integrated circuit such as a CPU (Central Processing Unit), for example, and is configured to operate using the output voltage Vout as a power supply voltage.

The control IC (switching control circuit) 20a is an integrated circuit configured to control switching operations of the NMOS transistors 30 and 31 based on a feedback voltage Vfb obtained by dividing the output voltage Vout by the resistors 35 and 36. The control IC 20a is provided with terminals A, FB, OUT1, and OUT2.

The output voltage Vout is applied to the terminal A, and the feedback voltage Vfb is applied to the terminal FB.

The gate electrode of the NMOS transistor 30 is connected to the terminal OUT1, and the gate electrode of the NMOS transistor 31 is connected to the terminal OUT2.

The control IC 20a includes a reference voltage generating circuit 50, level shift circuits 51 and 52, resistors 53 and 54, a comparator 55, pulse signal generating circuits 56 and 60, a drive circuit 57, and a current generating circuit 61.

The reference voltage generating circuit 50 is configured to generate a predetermined reference voltage Vref such as a bandgap voltage, for example.

Figure 2:
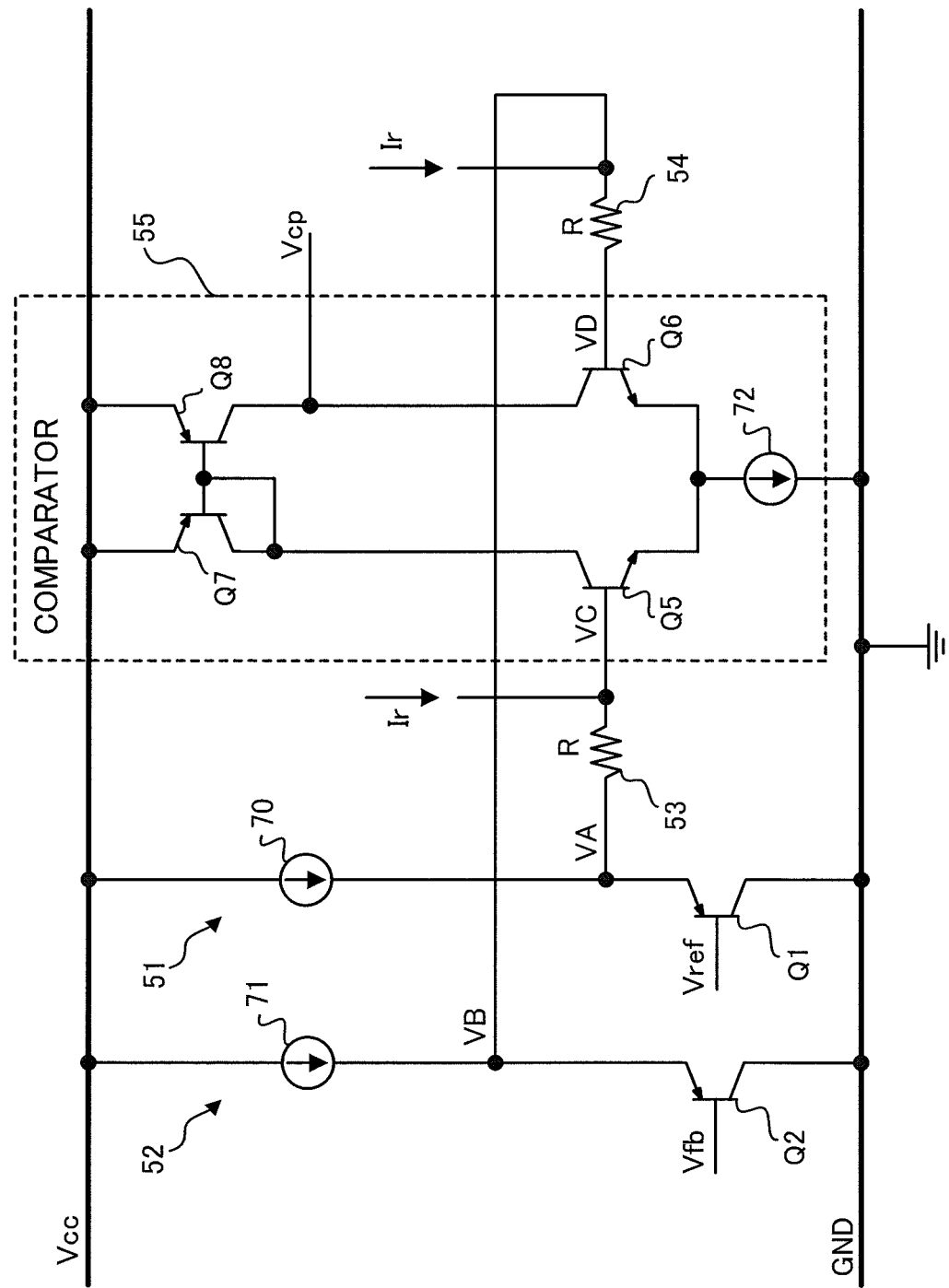
FIG. 2 is a diagram illustrating a configuration of level shift circuits 51 and 52 and a comparator 55.

The level shift circuit 51 is a circuit configured to output a voltage VA obtained by shifting the level of the reference voltage Vref to one end of the resistor 53 and, as shown in FIG. 2, includes the a PNP transistor Q1 and a constant current source 70. Since the PNP transistor Q1 and the constant current source 70 make up an emitter follower, the voltage VA is given by VA=Vref+Vbe1 (Vbe1: base-emitter voltage of PNP transistor Q1). The voltage Vcc is a voltage of a so-called internal power supply generated inside the control IC 20a, for example.

The level shift circuit 52 is a circuit configured to output a voltage VB obtained by shifting the level of the feedback voltage Vfb to one end of the resistor 54, and includes a PNP transistor Q2 and a constant current source 71. Since the PNP transistor Q2 and the constant current source 71 make up an emitter follower, the voltage is given by VB=Vfb+Vbe2 (Vbe2: base-emitter voltage of PNP transistor Q2). The circuit is so designed that current values are equal between the constant current sources 70 and 71 so that the voltage Vbe1 is equal to the voltage Vbe2.

The other end of the resistor 53 is connected to a non-inverting input terminal of the comparator 55, and the other end of the resistor 54 is connected to an inverting input terminal of the comparator 55. Here, the voltage of the non-inverting input terminal of the comparator 55 is referred to as VC, and the voltage of the inverting input terminal thereof is referred to as VD.

The comparator 55 is configured to compare the voltage VC and the voltage VD, and outputs a comparison voltage Vcp indicative of a result of the comparison. The comparator 55 includes a constant current source 72, NPN transistors Q5 and Q6, and PNP transistors Q7 and Q8.

The constant current source 72 and the NPN transistors Q5 and Q6 make up a differential input circuit, and each of the PNP transistors Q7 and Q8 operates as a current source. For this reason, the comparator 55 outputs the comparison voltage Vcp of a low level (hereinafter, low comparison voltage) when the voltage VD is higher than the voltage VC, and outputs the comparison voltage Vcp of a high level (hereinafter, high comparison voltage) when the voltage VD is lower than the voltage VC.

The pulse signal generating circuit 56 is a so-called one-shot circuit, and is configured to generate a pulse signal Vp1 which goes high only for a predetermined time T1 when the comparison voltage Vcp goes high.

When the pulse signal Vp1 goes high, the drive circuit 57 outputs a low drive signal Vdr2 to turn off the NMOS transistor 31, and thereafter, outputs a high drive signal Vdr1 only for the predetermined time T1 to turn on the NMOS transistor 30. When the pulse signal Vp1 goes low, the drive circuit 57 outputs the low drive signal Vdr1 to turn off the NMOS transistor 30, and thereafter, outputs the high drive signal Vdr2 to turn on the NMOS transistor 31. As such, the drive circuit 57 performs switching of the NMOS transistors 30 and 31 in a complementary manner by providing a so-called dead-time so that both of the NMOS transistors 30 and 31 are not on at the same time.

The pulse signal generating circuit 60 is configured to generate a pulse signal Vp2 that goes high in each of a switching period, for example, in every dead-time period immediately before the NMOS transistor 30 is turned on. That is to say, the pulse signal generating circuit 60 outputs the high pulse signal Vp2 in a time period in which the drive signal Vdr1 is low and the drive signal Vdr2 goes low from high.

The current generating circuit 61 is configured to generate a current Ir, which changes with the slope corresponding to the level of the output voltage Vout, every time the pulse signal Vp2 goes low from high. Specifically, the current generating circuit 61 is configured to generate the current Ir which reaches zero while the pulse signal Vp2 is high, and increases with the slope corresponding to the level of the output voltage Vout when the pulse signal Vp2 goes low. The current generating circuit 61 changes the level of the reference voltage Vref by supplying the current Ir to a node at which the resistor 53 and the non-inverting terminal of the comparator 55 are connected.

The voltage VC is given by $$VC = VA + Ir \times R = Vref + Vbe1 + Ir \times R \qquad (1)$$

where the resistance value of the resistor 53 is R, the current value of the current Ir is Ir, and the input impedance of the comparator 55 is assumed infinite.

Thus, in an embodiment of the present invention, a slope voltage Vs (Vs=Ir×R) increasing with a slope corresponding to a level of the output voltage Vout is added to the reference voltage Vref every switching period.

The current generating circuit 61 supplies the current Ir to the node at which the level shift circuit 52 and the resistor 54 are connected so that the voltage Vbe1 is equal to the voltage Vbe2, namely, so that the offset of the comparator 55 is cancelled.

Thus, the voltage VD is given by $$VD = VB = Vfb + Vbe2 = Vfb + Vbe1 \qquad (2)$$

The amplitude limiting circuit 62 is configured to limit the amplitude of the slope voltage Vs by limiting a current value of the current Ir. The current generating circuit 61 and the amplitude limiting circuit 62 will be described later in detail. The current generating circuit 61 and the resistor 53 correspond to a voltage generating circuit, and the level shift circuit 51 and the resistor 53 correspond to an adding circuit.

The NMOS transistor 30 is a high-side (power-supply side) power transistor, and has a drain electrode (input electrode) applied with an input voltage Vin and source electrode (output electrode) connected to the drain electrode of the NMOS transistor 31 and the inductor 32.

The NMOS transistor 31 is a low-side (ground side) power transistor, and has a source electrode (output electrode) that is grounded and a drain electrode connected to the inductor 32.

The inductor 32 and the capacitor 33 forms an LC filter to smooth the voltage at the node at which the NMOS transistors 30 and 31 are connected. Here, a current running through the inductor 32 is referred to as an inductor current IL.

The resistor 34 is an ESR (Equivalent Series Resistance) of the capacitor 33. Since the capacitor 33 is a ceramic capacitor, for example, the resistance value of the resistor 34 is a small value of several mΩ, etc., for example. For this reason, a ripple voltage contained in the output voltage Vout also is small.

==Details of Current Generating Circuit 61 and Amplitude Limiting Circuit 62==

Specific configurations of the current generating circuit 61 and the amplitude limiting circuit 62 will be described with reference to FIG. 3. The current generating circuit 61 includes a charging/discharging circuit 80, a level shift circuit 81, and a voltage/current converting circuit 82.

The charging/discharging circuit 80 is configured to charge a capacitor 91 which has been discharged, each time a pulse signal Vp2 goes from high ("H" level) to low ("L" level), and generate a voltage V1 changing with a slope corresponding to the level of the output voltage Vout. The charging/discharging circuit 80 includes a bias current generating circuit 90, the capacitor 91, and an NMOS transistor M1.

Figure 4:
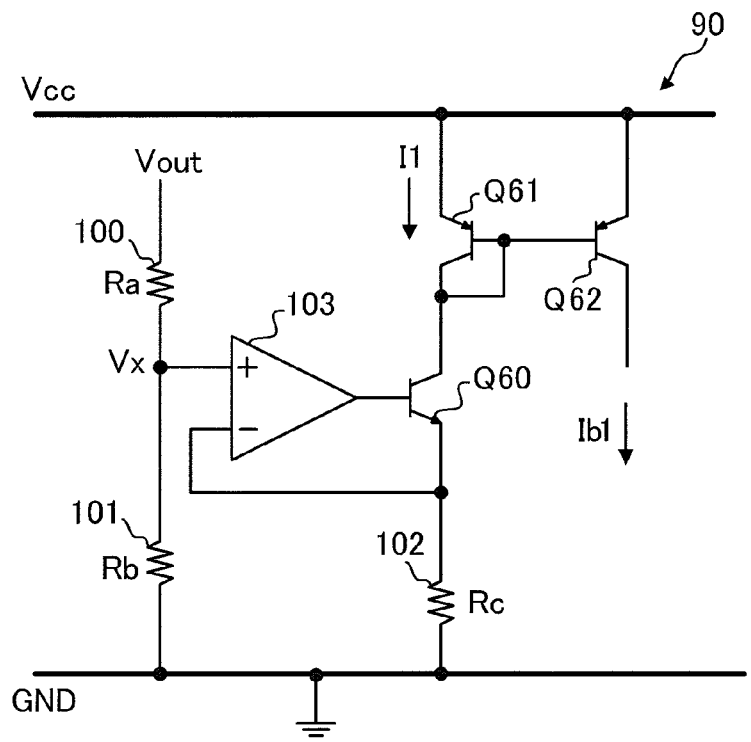
FIG. 4 is a diagram of a configuration of a bias current generating circuit 90.

The bias current generating circuit 90 is a circuit configured to generate a bias current Ib1 proportional to the output voltage Vout, and includes resistors 100 to 102, an operational amplifier 103, an NPN transistor Q60, and PNP transistors Q61 and Q62 as illustrated in FIG. 4.

The resistor 100 and the resistor 101 are configured to divide the output voltage Vout, and apply a divided voltage Vx to the non-inverting input terminal of the operational amplifier 103. The voltage Vx is given by $$Vx = (Rb/(Ra+Rb)) \times Vout \qquad (3)$$

where Ra and Rb are the resistance values of the resistors 100 and 101, respectively.

The base electrode of the NPN transistor Q60 is connected to the output of the operational amplifier 103, and the emitter electrode thereof is connected to the inverting input terminal of the operational amplifier 103. Therefore, the operational amplifier 103 controls the NPN transistor Q60 so that the voltage of the inverting input terminal becomes equal to the voltage Vx that is applied to the non-inverting input terminal. As a result, a voltage applied to the resistor 102 is equal to the voltage Vx, and a current Ix=Vx/Rc is passed through the resistor 102. The resistance value of the resistor 102 is referred to as Rc.

The PNP transistors Q61 and Q62 make up a current mirror circuit in which equal currents flow to the PNP transistors Q61 and Q62, respectively, for example, and thus the bias current Ib1 passed through the PNP transistor Q62 is given by $$Ib1 = Vx/Rc = (Rb/(Rc \times (Ra+Rb))) \times Vout \qquad (4).$$

Therefore, the bias current Ib1 results in a current proportional to the output voltage Vout. It is assumed in an embodiment of the present invention that the resistors 100 to 102 with such temperature coefficients are selected that temperature variations of the bias current Ib1 are sufficiently decreased.

Figure 3:
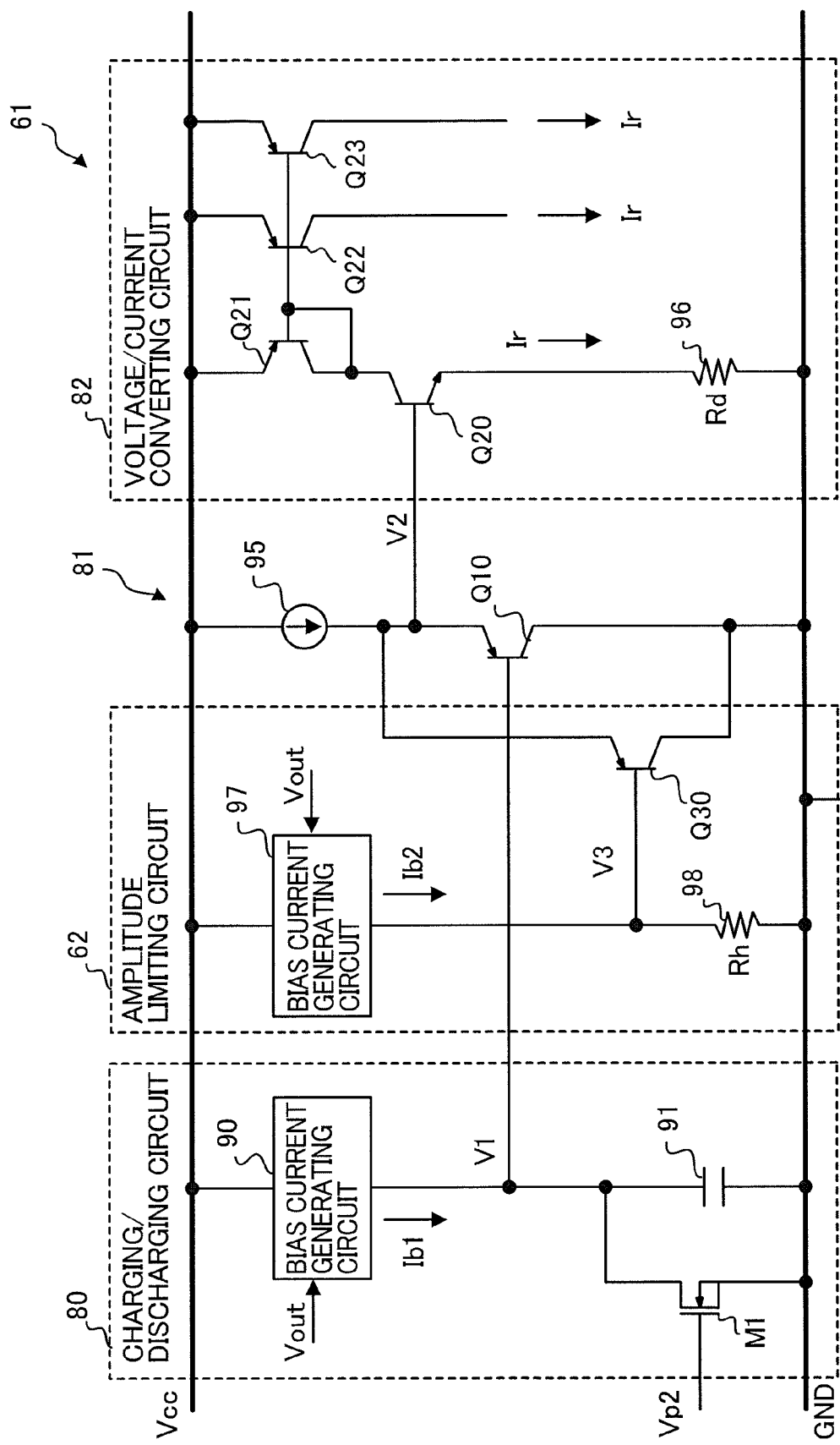
FIG. 3 is a diagram of configurations of a current generating circuit 61 and an amplitude limiting circuit 62.

The bias current Ib1 is supplied to the drain electrode of the NMOS transistor M1 and the capacitor 91 illustrated in FIG. 3. Therefore, if the pulse signal Vp2 is high, for example, the NMOS transistor M1 is on, resulting in the voltage V1, i.e., the charging voltage of the capacitor 91, being substantially zero.

On the other hand, if the pulse signal Vp2 is low, the NMOS transistor M1 is off, and therefore the voltage V1 is charged with the bias current Ib1 proportional to the output voltage Vout. The voltage V1 is given by $$V1 = (Ib1 \times T)/C \qquad (5)$$

where T is a time period elapsed since turning off of the NMOS transistor M1, and C is a capacitance value of the capacitor 91.

The level shift circuit 81 is a circuit configured to output a voltage V2 acquired by shifting the level of the voltage V1, and includes a PNP transistor Q10 and a constant current source 95. The PNP transistor Q10 and the constant current source 95 make up an emitter follower.

The voltage/current converting circuit 82 is a circuit configured to generate the current Ir having a value corresponding to the level of the voltage V2, and includes a resistor 96, an NPN transistor Q20, and PNP transistors Q21 to Q23.

The voltage V2 is applied to the base electrode of the NPN transistor Q20, and the emitter electrode is connected to the resistor 96. When the voltage V2 increases and the NPN transistor Q20 is turned on, the current Ir, which is inversely proportional to a resistance value Rd of the resistor 96 and is proportional to the level of the voltage V2, is passed through the NPN transistor Q20. The current Ir is given by $$Ir = (V2 - Vbe20)/Rd \qquad (6)$$

where Vbe20 is a base-emitter voltage of the NPN transistor Q20.

The current Ir is passed through the diode-connected PNP transistor Q21 and the PNP transistors Q21 to Q23 make up a current mirror circuit. In an embodiment of the present invention, since the PNP transistors Q21 to Q23 are of the same transistor size, the PNP transistors Q22 and Q23 operate as current sources which are configured to supply the current Ir proportional to the level of the voltage V2.

For example, if the level shift circuit 81 shifts the level of the voltage V1 and outputs such level-shifted voltage, the voltage V2 results in V2=V1+Vbe10, where Vbe10a is base-emitter voltage of the PNP transistor Q10. An embodiment of the present invention is designed such that the NPN transistor Q20 is turned off when the voltage V1 is zero and the voltage V2 is Vbe10 described above. Therefore, if the voltage V1 is zero, the current Ir passed through the NPN transistor Q20 reaches zero. On the other hand, if the voltage V1 increases from zero, the voltage V1 changes with the slope proportional to the level of the output voltage Vout, as described above. Thus, in such a case, the current Ir also changes with the slope proportional to the level of the output voltage Vout.

The amplitude limiting circuit 62 (clamping circuit) is a circuit that is configured to clamp the voltage V2 to limit the amplitude of the slope voltage Vs, and includes a bias current generating circuit 97, a resistor 98, and a PNP transistor Q30.

Figure 5:
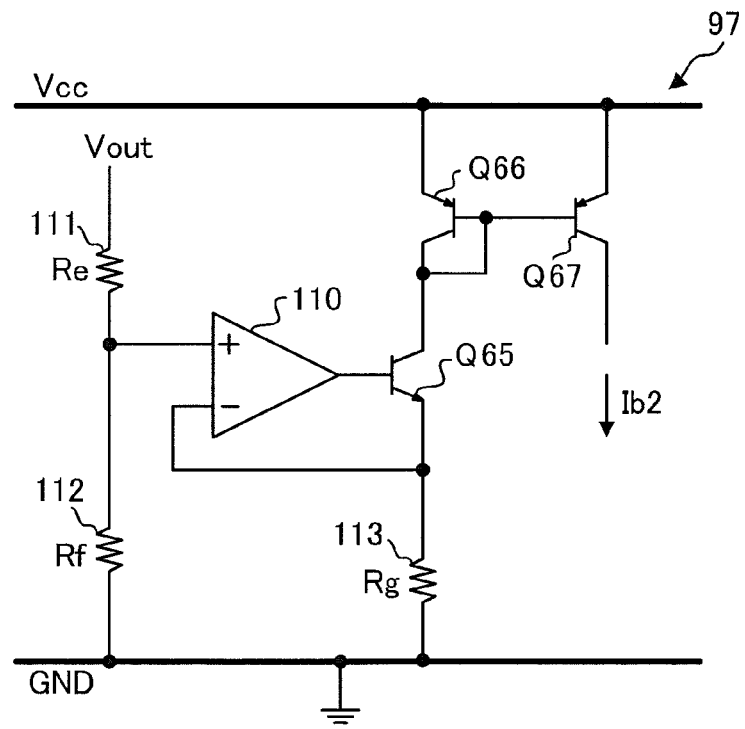
FIG. 5 is a diagram of a configuration of a bias current generating circuit 97.

The bias current generating circuit 97 is a circuit configured to generate a bias current Ib2 proportional to the output voltage Vout, and includes an operational amplifier 110, resistors 111 to 113, an NPN transistor Q65, and PNP transistors Q66 and Q67 as illustrated in FIG. 5. The bias current generating circuit 97 is similar to the bias current generating circuit 90, and therefore the bias current generating circuit 97 operates similarly to the bias current generating circuit 90. The bias current Ib2 is given by $$Ib2=(Rf/(Rg\times(Re+Rf)))\times Vout \quad (7)$$

where Re, Rf, and Rg are the resistance values of the resistors 111, 112, and 113, respectively.

The bias current Ib2 is supplied to the resistor 98. A voltage V3 generated in the resistor 98 is given by $$V3=(Rh\times Rf/(Rg\times(Re+Rf)))\times Vout \quad (8)$$

where Rh is the resistance value of the resistor 98. It is assumed in an embodiment of the present invention that the resistors 98, 111 to 113 with such temperature coefficients are selected that sufficiently decrease the temperature variations of the voltage V3.

Since the PNP transistor Q30 is connected to the constant current source 95 similarly to the PNP transistor Q10, the PNP transistor Q30 and the constant current source 95 make up an emitter follower. Therefore, a voltage of a lower level is selected from the voltages V1 and V3, to be outputted as the voltage V2. Thus, the voltage V2 never becomes higher than the voltage V3+Vbe30 (Vbe30: the base-emitter voltage of the PNP transistor Q30). In other words, the amplitude limiting circuit 62 is configured to clamp the voltage V2 so that the voltage V2 does not exceed the voltage V3+Vbe30. If the voltage V2 is clamped, the current value of the current Ir also becomes constant. As a result, the amplitude of the slope voltage Vs (Ir×R) is limited.

==Limited Magnitude of Amplitude of Slope Voltage Vs==

Here, a description will be given of the limited magnitude of the amplitude of the slope voltage Vs. It is assumed that the amplitude of the slope voltage Vs according to an embodiment of the present invention is limited to an amplitude greater than the amplitude of the slope voltage Vs at a time when the output voltage Vout of the target level is generated.

In other words, while the output voltage Vout of the target level is generated, the voltage V2 is not clamped but changes with the voltage V1.

Figure 6:
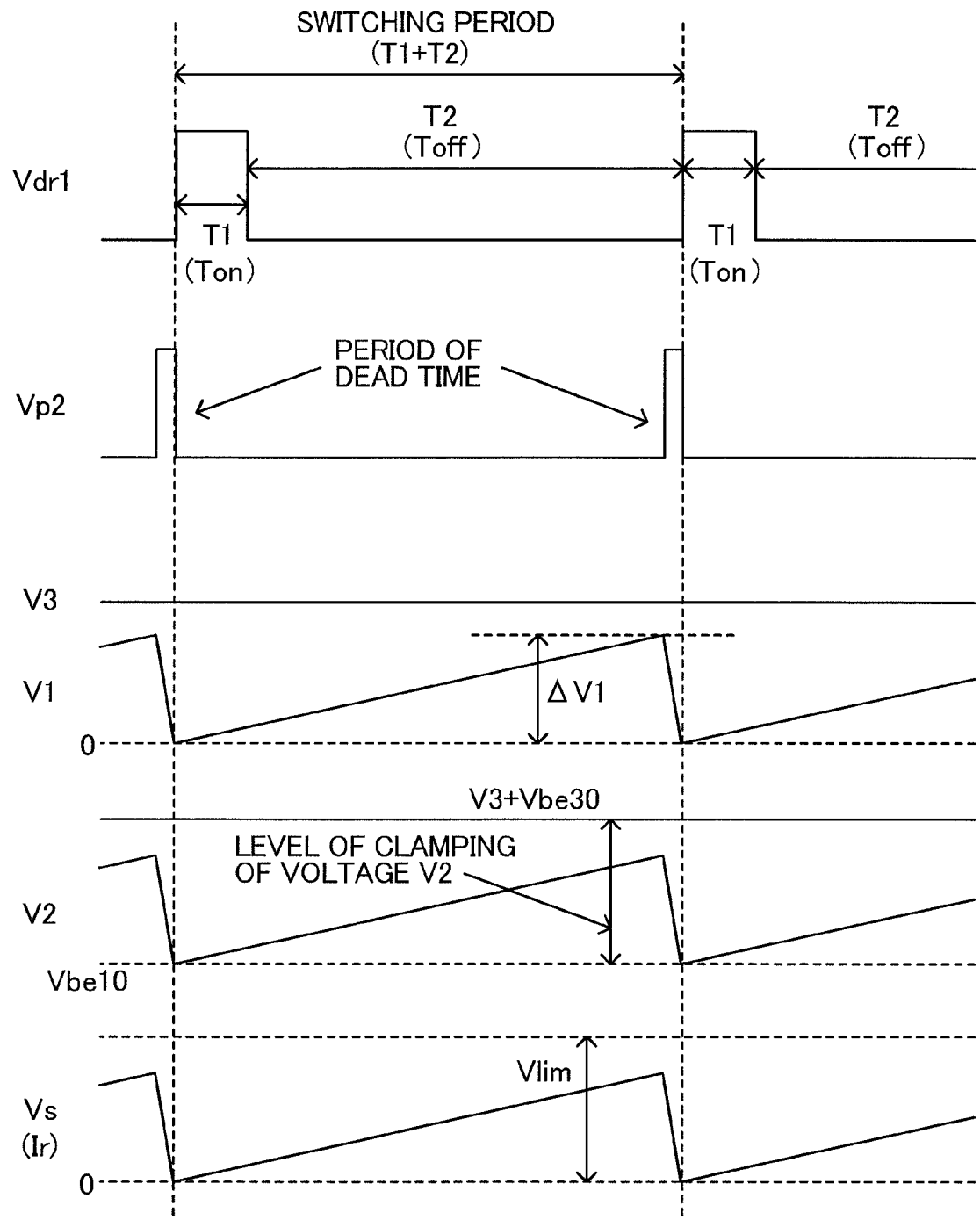
FIG. 6 is a diagram for explaining a clamp level of a voltage V2 and a predetermined amplitude Vlim.

Then, a description will be given of the voltages V1 to V3 and the slope voltage Vs when the output voltage Vout of the target level is generated, with reference to FIG. 6. When the output voltage Vout of the target level is generated, a following relationship is established among an input voltage Vin, the output voltage Vout, a time period Ton during which a high-side (power-supply side) NMOS transistor 30 is on, and a time period Toff during which the NMOS transistor is off:

$$Vout=(Ton/(Ton+Toff))\times Vin \quad (9).$$

Equation (9) is satisfied when a common switching power supply circuit operates in a so-called continuous current mode. In an embodiment of the present invention, the time period Ton is a predetermined time T1; the input voltage Vin is a predetermined voltage; and the output voltage Vout is the voltage of the target level. Thus, when the output voltage Vout of the target level is generated, the time period Toff during which the NMOS transistor 30 is off is unambiguously determined to be a predetermined time T2, for example. That is to say, a so-called switching period Ton+Toff during a time period during which the output voltage Vout of the target level is generated is a predetermined time T1+T2.

As described above, since the pulse signal Vp2 goes high every dead time immediately before the NMOS transistor 30 is turned on, the voltage V1 increases from zero during the switching period T1+T2. The level of the voltage V1 (or amplitude ΔV1 of the voltage V1) when the voltage V1 rises only during the switching period is given by $$V1 = (Ib1/C)\times(T1+T2) \quad (10)$$
$$= A1\times(T1+T2)\times Vout.$$

where the coefficient A1 of Equation (10) is Rb/(C×Rc×(Ra+Rb)). The dead time is illustrated with a longer period to facilitate understanding for convenience, however in actuality, the dead time is a period sufficiently shorter than the predetermined time T1, for example.

As described in Equation (8), the voltage V3 is given by $$V3=(Rh\times Rf/(Rg\times(Re+Rf)))\times Vout \quad (8).$$

In this case, the level of the voltage V3 is determined such that the voltage V2 is not clamped while the output voltage Vout of the target level is generated. Thus, an embodiment of the present invention is designed such that the coefficient (Rh×Rf/(Rg×(Re+Rf))) of Equation (8) is greater than the coefficient A1×(T1+T2) of Equation (10). In such a case, the voltage V2 and the slope voltage Vs change in the same manner as the voltage V1.

The level of the voltage V2 when the voltage V2 is clamped is given by $$V2 = V3 + Vbe30 \quad (11)$$
$$= (Rh\times Rf/(Rg\times(Re+Rf)))\times Vout + Vbe30.$$

Further, the current Ir in this case is given by $$Ir = (V2 - Vbe20)/Rd \quad (12)$$
$$= ((Rh\times Rf/(Rg\times(Re+Rf)))\times Vout + Vbe30 - Vbe20)/Rd.$$

Thus, the amplitude Vlim of the slope voltage Vs while the voltage V2 is clamped is limited to the amplitude given by the following Equation (13)

$$Vlim = R \times Ir \quad (13)$$
$$= R \times ((Rh \times Rf / (Rg \times (Re + Rf))) \times Vout + Vbe30 - Vbe20)/Rd.$$

As expressed by Equation (13), the limited amplitude Vlim of the slope voltage Vs increases with increase in the output voltage Vout.

==Operation of Ripple Convertor 10a==

<<In the Case of Steady State>>

A description will be given of the operation of the ripple convertor 10a while the output voltage Vout of the target level is generated (during a steady state) with reference to FIGS. 1 and 7.

In an embodiment of the present invention, since a ripple voltage contained in the output voltage Vout is sufficiently small, the ripple voltage contained in the feedback voltage Vfb is also sufficiently small. That is to say, the feedback voltage Vfb during the time period during which the output voltage Vout of the target level is generated is substantially constant. Therefore, for convenience, a voltage VD is constant in level in FIG. 7. Since the input voltage Vin is a predetermined voltage, the off time period Toff of the NMOS transistor 30 during the time period during which the output voltage Vout of the target level is generated is the predetermined time T2, for example, and the switching period (Ton+Toff) is T1+T2.

First, when a voltage VC (one voltage) increases in level to the voltage VD (the other voltage) at time t0, a comparison voltage Vcp goes high, and therefore, a high-level pulse signal Vp1 is outputted. Thus, a drive signal Vdr2 goes low to turn off the NMOS transistor 31, and a pulse signal Vp2 goes high. As a result, the slope voltage Vs reaches zero and the voltage VC decreases to VC=Vref+Vbe1.

At time t1 when the dead time has elapsed from time t0, a drive signal Vdr1 goes high to turn on the NMOS transistor 30. As a result, the pulse signal Vp2 goes low, and therefore, the slope voltage Vs increases with the slope proportional to the level of the output voltage Vout. The voltage VC also increases with the slope proportional to the level of the output voltage Vout similarly to the slope voltage Vs.

At time t2 when the predetermined time T1 has elapsed from time t1, the drive signal Vdr1 goes low to turn off the NMOS transistor 30. At time t3 when the dead time has elapsed from time t2, the drive signal Vdr2 goes high to turn on the NMOS transistor 31.

Subsequently, at time t4 when the predetermined time T2 has elapsed from time t2, the voltage VC increases in level to the voltage VD, and the operation at time t0 is repeated again. Such an operation is repeated, thereby generating the output voltage Vout of the target level.

The voltage across the inductor 32 while the NMOS transistor 30 is turned off and the NMOS transistor 31 is turned on is the output voltage Vout. Thus, during a time period during which the NMOS transistor 31 is on, the inductor current IL decreases with the slope proportional to the level of the output voltage Vout and inversely proportional to an inductance L of the inductor 32. Since the inductance L is a predetermined value, the inductor current IL during a time period during which the NMOS transistor 31 is on is substantially proportional to the level of the output voltage Vout.

In the ripple converter 10a, a ripple voltage or a voltage of a shape similar to that of the ripple voltage is not added to the reference voltage Vref, however, the slope voltage Vs with such a slope that the voltage changes in a similar manner to the ripple voltage is added to the reference voltage Vref during a time period during which the NMOS transistor 30 is off. That is to say, in an embodiment of the present invention, in order to detect the timing of turning on of the NMOS transistor 30, the voltage VC is changed with the slope (proportional to Vout) similar to the slope (proportional to Vout/L) of the ripple voltage during the time period during which the NMOS transistor 30 is off (e.g., time t2 to time t4).

Therefore, the ripple convertor 10a operates in a stable manner similarly to common ripple converters in which the ripple voltage is added to the reference voltage Vref, for example. That is to say, the ripple convertor 10a operates in a stable manner without using an external component, etc., for detecting the inductor current IL, etc. In the steady state, the amplitude of the slope voltage Vs is always smaller than the predetermined amplitude Vlim. Thus, the amplitude of the slope voltage Vs is not limited.

<<In the Case of Transient Change of Load>>

Figure 8:
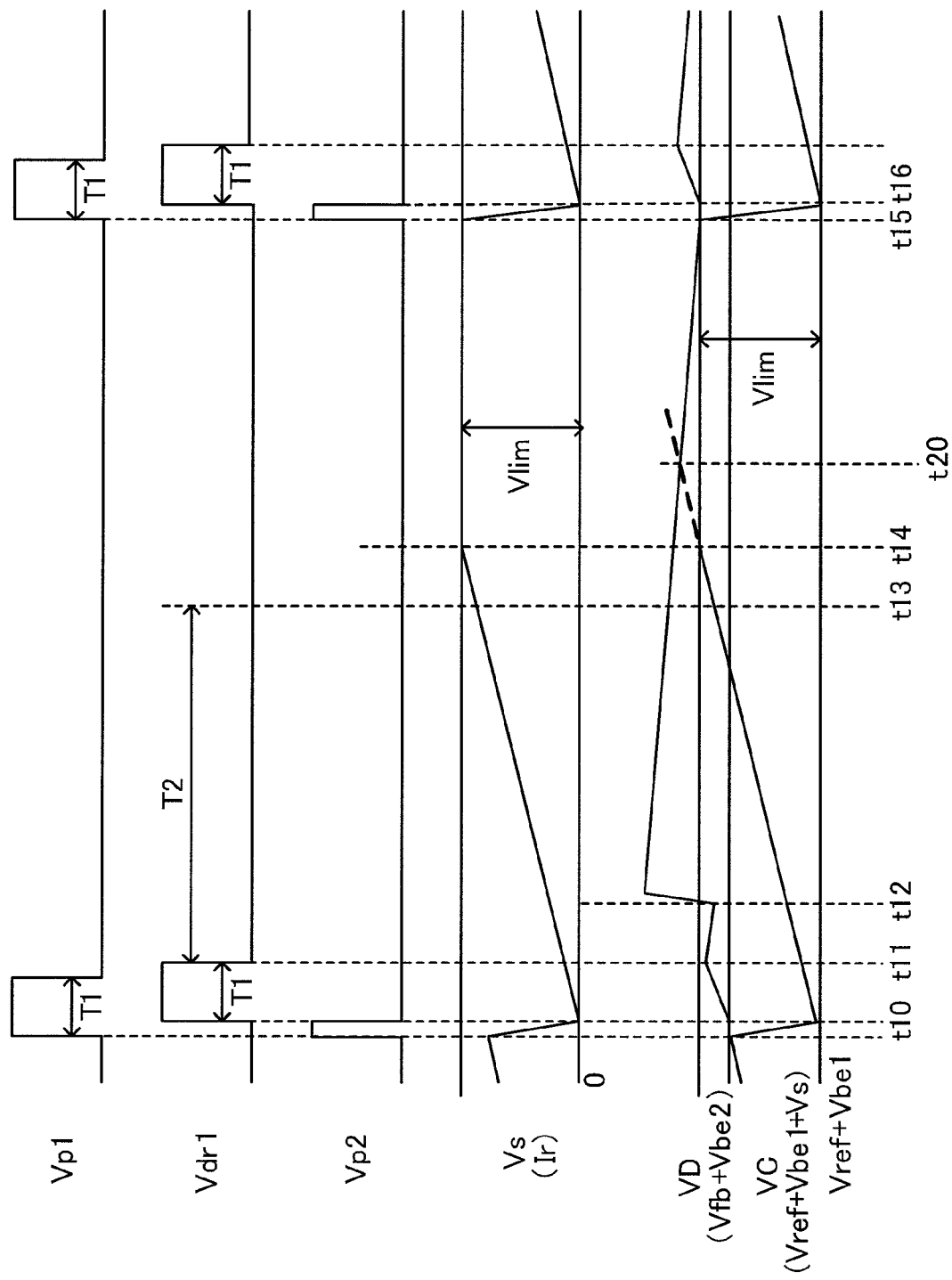
FIG. 8 is a diagram of a major waveform of a ripple converter 10a when a load 15 changes in condition in a transient manner.

A description will be given of the operation of the ripple convertor 10a in the case where the load 15 changes in condition in a transient manner from a heavy load to a light load, with reference to FIG. 8. In FIG. 8, it is assumed that the load 15 changes in condition in a transient manner at the timing of time t12, for example.

First, when the NMOS transistor 30 is turned on at time t10, the output voltage Vout increases, and therefore, the feedback voltage Vfb and the voltage VD also increase. At time t10, since the slope voltage Vs increases from zero, the voltage VC also increases.

At time 11 when the predetermined time T1 has elapsed from time t10, the NMOS transistor 30 is turned off, and therefore, the output voltage Vout decreases and the feedback voltage Vfb and the voltage VD also decrease.

At time t12, when the load 15 changes in condition in a transient manner from a heavy load to a light load, an overshoot occurs in the output voltage Vout, thereby significantly increasing the voltage VD. Thus, even at time t13 when the predetermined T2 has elapsed from time t11, the voltage VD does not become equal in level to the voltage VC.

At time t14, the slope voltage Vs reaches the predetermined amplitude Vlim, thereby clamping the slope voltage Vs and the voltage VC. Thereafter, when the voltage VD decreases and becomes equal in level to the clamped voltage VC at time t15, the pulse signal Vp1 goes high. Therefore, at time t16 when the dead time has elapsed from time t15, the NMOS transistor 30 is turned on again.

For example, if the slope voltage Vs is not limited to the predetermined amplitude Vlim, the voltage VC continues to increase as indicated by a dashed line. In such a case, the voltage VD becomes equal in level to the voltage VC at time t20, which is earlier than time t15, and the NMOS transistor 30 is turned on. In other words, the NMOS transistor 30 may be turned on in such timing that the overshot output voltage Vout is not sufficiently decreased. However, in the ripple convertor 10a, the amplitude of the slope voltage Vs is limited, so as to delay the timing of turning on of the NMOS transistor 30. Therefore, as compared to the case where the amplitude of the slope voltage Vs is not limited, a deviation of the output voltage Vout from the target level can be decreased.

==Timing of Change in Slope Voltage Vs==

In the ripple convertor 10a, it is assumed that the slope voltage Vs is increased at the timing of turning on of the NMOS transistor 30. In order to stabilize the operation of the ripple convertor 10a, however, it is only necessary that the slope (proportional to Vout) of the voltage VC during the time period during which the NMOS transistor 30 is off is similar to the slope (proportional to Vout/L) of the ripple voltage. Thus, as illustrated in FIG. 1, for example, a pulse signal generating circuit 65 may be used in place of the pulse signal generating circuit 60.

Figure 9:
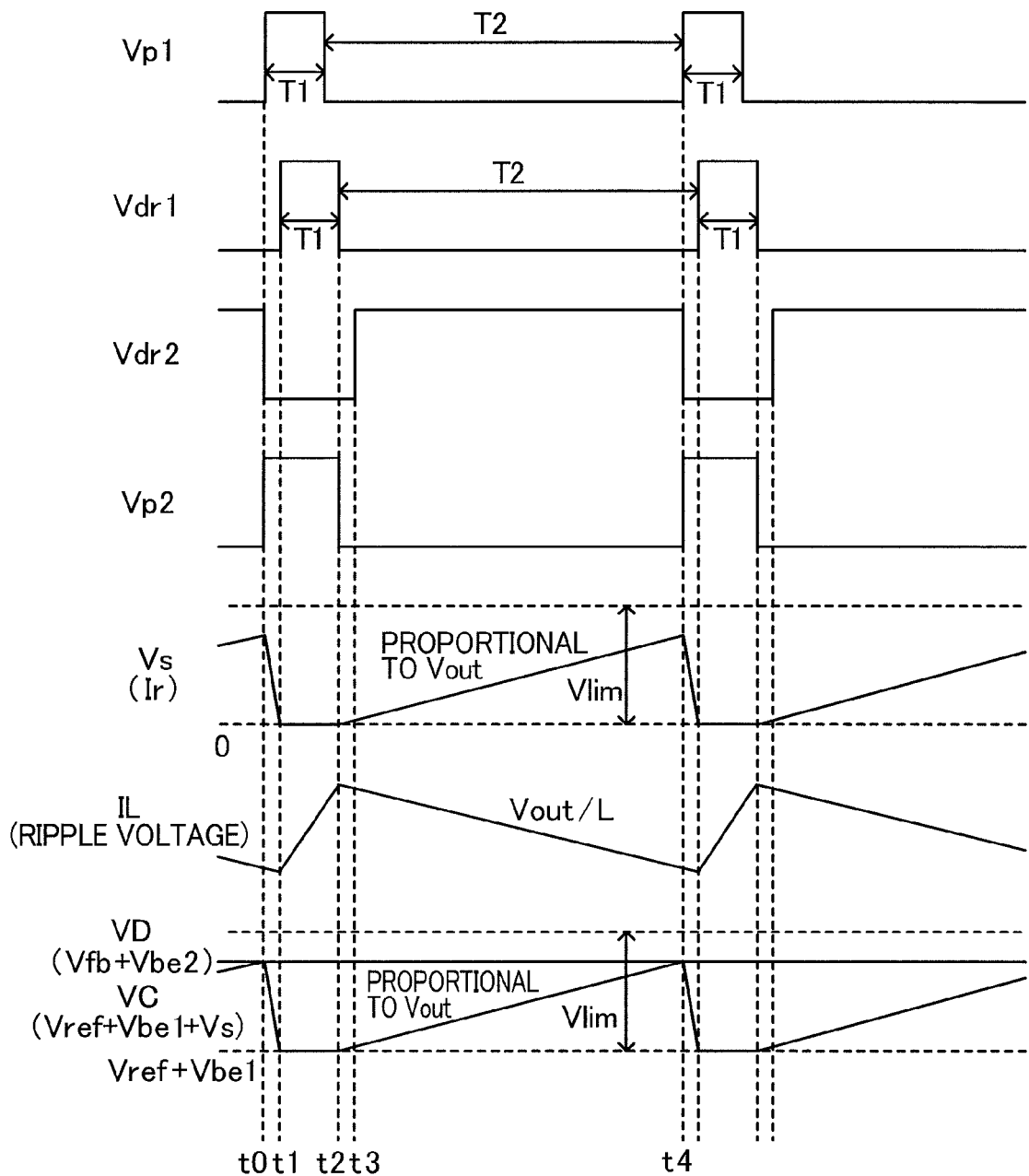
FIG. 9 is a diagram of a major waveform of a ripple converter 10a in a steady state.

For example, as illustrated in FIG. 9, the pulse signal generating circuit 65 outputs the high-level pulse signal Vp2 during a time period from a time when the drive signal Vdr2 goes low to a time when the drive signal Vdr1 goes low. Although the slope voltage Vs and the voltage VC increases from time t2 in such a case, the slope of the voltage VC during a time period during which the NMOS transistor 30 is off is similar to the slope of the ripple voltage. Thus, even in such a case, the ripple converter 10a operates in a stable manner.

However, in this case, the time period during which the slope voltage Vs increases is not the switching period (T1+T2) but the predetermined time T2. Therefore, the level of the voltage V1 when the predetermined time T2 has elapsed is expressed by Equation (14), instead of Equation (10).

$$V1 = (Ib1/C) \times T2 \qquad (14)$$
$$= A1 \times T2 \times Vout$$

As described above, in an embodiment of the present invention, the level of the voltage V3 is determined such that the voltage V2 is not clamped, while the output voltage Vout of the target level is generated. Therefore, in this case, design is such that the coefficient (Rh×Rf/(Rg×(Re+Rf))) of Equation (8) is greater than the coefficient A1×T2 of Equation (14). By setting the level of the voltage V3 as such, even if the timing of increasing the slope voltage Vs is set at time t2, an effect similar to that in the case of time t1 can be acquired. In other words, the amplitude of the slope voltage Vs is limited to the predetermined amplitude Vlim which is greater than the amplitude during the time period during which the output voltage Vout of the target level is generated. Therefore, even if the load 15 changes in condition in a transient manner, a deviation of the output voltage Vout from the target level can be suppressed.

Second Embodiment

Figure 10:
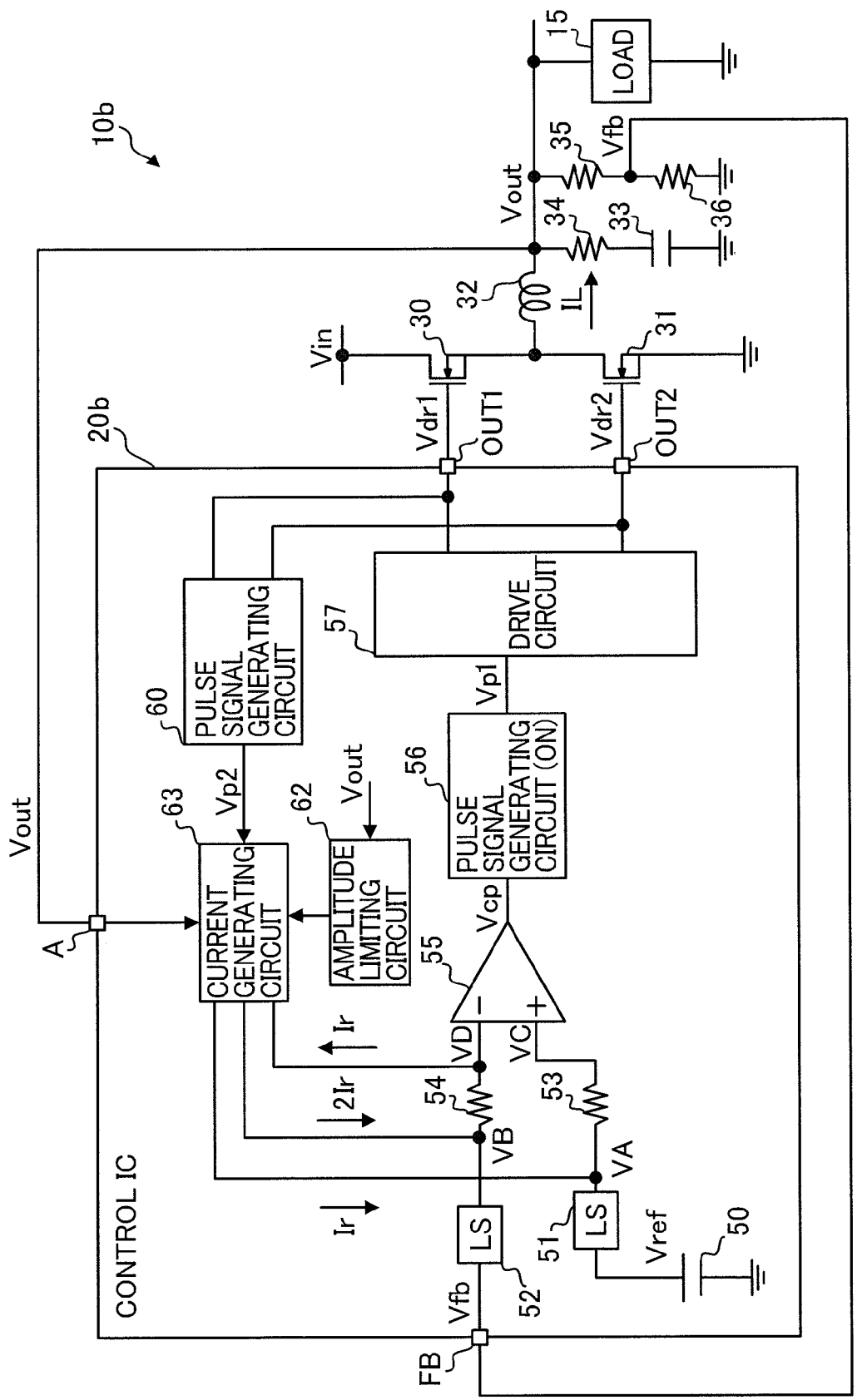
FIG. 10 is a diagram of a configuration of a ripple convertor 10b according to a second embodiment of the present invention.

FIG. 10 depicts a configuration of a ripple converter 10b of a fixed-on-time system according to a second embodiment of the present invention.

In the ripple converter 10b, in order to operate the ripple converter 10b in a stable manner, a slope voltage changing with a slope corresponding to the level of the output voltage Vout is added to the feedback voltage Vfb. In the present specification, the blocks equivalent to those illustrated in FIG. 1, for example, are designated by the same reference numerals. When comparing FIG. 1 and FIG. 10, a control IC 20b includes a current generating circuit 63 in place of the current generating circuit 61.

The current generating circuit 63 is configured to generate a source current (current Ir, 2×Ir (hereinafter, referred to as 2Ir)) and a sink current (current Ir) changing with the slope corresponding to the level of the output voltage Vout each time the pulse signal Vp2 is changed from high to low.

Figure 11:
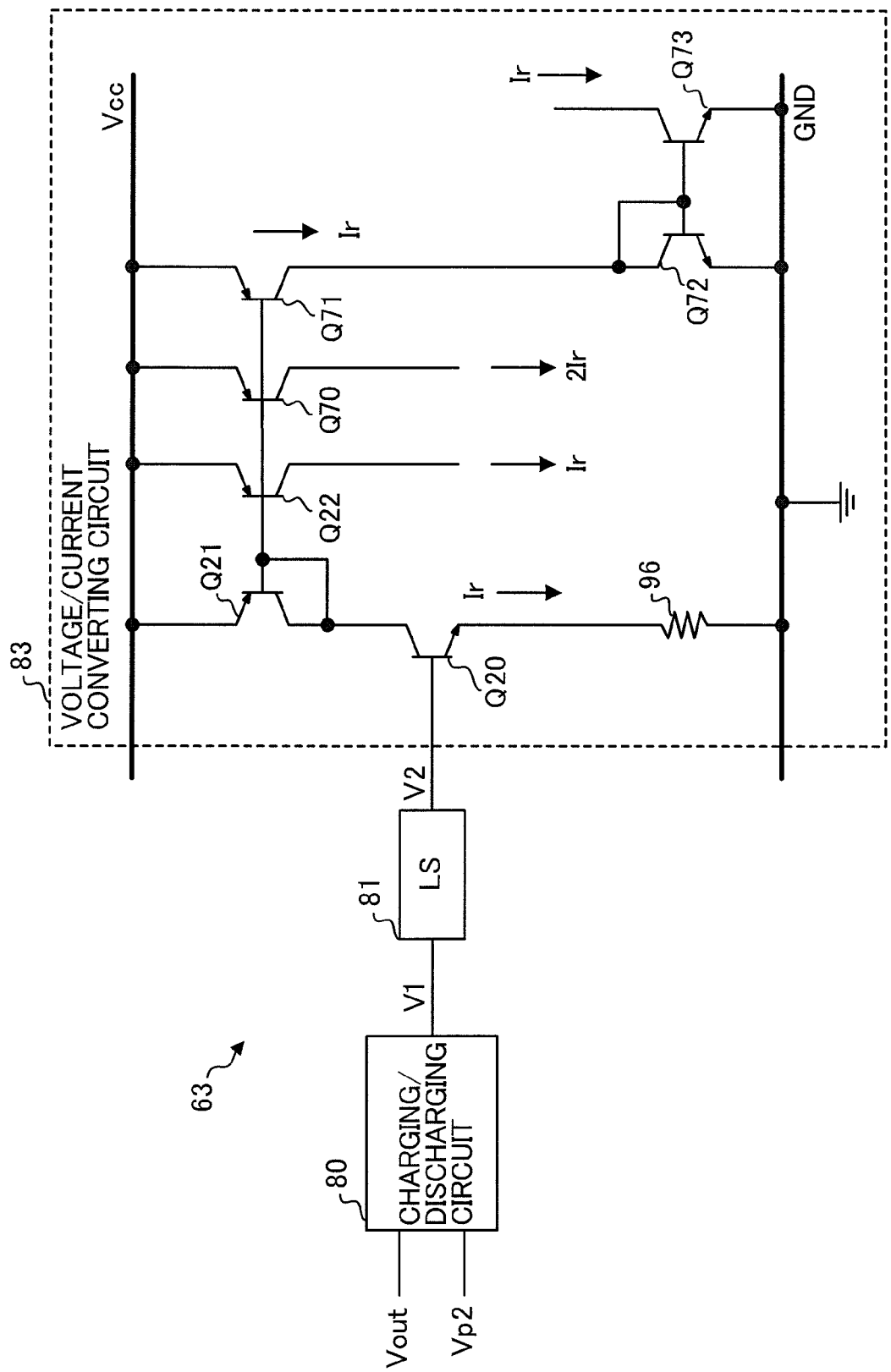
FIG. 11 is a diagram illustrating a configuration of a current generating circuit 63.

FIG. 11 depicts details of the current generating circuit 63. The current generating circuit 63 includes the charging/discharging circuit 80, the level shift circuit (LS) 81, and a voltage/current converting circuit 83.

In FIGS. 8 and 3, the blocks designated by the same reference numerals are equivalent, and therefore, PNP transistors Q70, Q71, and NPN transistors Q72, Q73 will be described. The voltage V2 of the level shift circuit 81 of FIG. 8 is clamped by the amplitude limiting circuit 62 as in the case illustrated in FIG. 3.

The PNP transistors Q70 and Q71 make up a current mirror circuit together with the PNP transistor Q21. However, design is such that the current (2Ir), twice as much as the current Ir, is passed through the PNP transistor Q70, and that the current Ir is passed through the PNP transistor Q71. Therefore, the PNP transistor Q70 generates the current 2Ir that is the source current. The diode-connected NPN transistor Q72 and the NPN transistor Q73 make up a current mirror circuit, in which the same currents are passed therethrough. Thus, the NPN transistor Q73 generates the current Ir that is the sink current.

As illustrated in FIG. 10, the current 2Ir is supplied to the node at which the level shift circuit 52 and the resistor 54 are connected, and the current Ir, i.e., the sink current is passed through the node at which the resistor 54 and the non-inverting input terminal of the comparator 55 are connected.

Therefore, the voltage VD is given by $$VD = VB - Ir \times R = Vfb + Vbe2 - Ir \times R \qquad (15)$$

where the resistance value of the resistor 54 is R.

The current generating circuit 63 supplies the current Ir to the node, at which the level shift circuit 51 and the resistor 53 are connected, so that the a voltage Vbe1 becomes equal to a voltage Vbe2, i.e., so that an offset of the comparator 55 is cancelled.

Thus, the voltage VC is given by $$VC = VA = Vref + Vbe1 = Vref + Vbe2 \qquad (16).$$

As described above, the current Ir increases in proportion to the level of the output voltage Vout each time the pulse signal Vp2 changes from high to low. Therefore, the voltage VD decreases with the slope proportional to the level of the output voltage Vout each time the pulse signal Vp2 changes from high to low.

==Operation of Ripple Converter 10b==
<<In the Case of Steady State>>

A description will be given of the operation of the ripple convertor 10b while the output voltage Vout of the target level is generated (during the steady state) with reference to FIGS. 10 and 12. Since the reference voltage Vref and the voltage Vbe1 are constant in level in this case, the voltage VC is constant in level. Since the input voltage Vin is a predetermined voltage, the off-time period Toff of the NMOS transistor 30 during the time period during which the output voltage Vout of the target level is generated is the predetermined time T2, for example, and the switching period (Ton+Toff) is T1+T2.

First, when the voltage VD decreases to the level of the voltage VC at time t30, the comparison voltage Vcp goes high, and therefore, the high-level pulse signal Vp1 is outputted. Thus, the drive signal Vdr2 goes low to turn off the NMOS transistor 31 and the pulse signal Vp2 goes high. As a result, the current Ir generated by the current generating circuit 63 reaches zero, and the voltage VD increases to VD=Vfb+Vbe2.

At time t31 when the dead time has elapsed from time t30, the drive signal Vdr1 goes high to turn on the NMOS transistor 30. As a result, the pulse signal Vp2 goes low, and therefore, the slope voltage Vs increases with the slope proportional to the level of the output voltage Vout. Therefore, the voltage VD decreases with the slope proportional to the level of the output voltage Vout.

At time t32 when the predetermined time T1 has elapsed from time t31, the drive signal Vdr1 goes low to turn off the NMOS transistor 30. At time t33 when the dead time has elapsed from time t32, the drive signal Vdr2 goes high to turn on the NMOS transistor 31.

Thereafter, at time t34 when the predetermined time T2 has elapsed from time t32, the voltage VD decreases to the level of the voltage VC, and the operation at time t30 is repeated again.

The slope (proportional to Vout) of the voltage VD during the time period during which the NMOS transistor 30 is off (e.g., time t32 to time t34) is similar to the slope (proportional to Vout/L) of the ripple during the period during which the NMOS transistor 30 is off. Therefore, while the NMOS transistor 30 is off, the ripple converter 10b operates in a stable manner similarly to common ripple converters in which the ripple voltage is added to the feedback voltage Vfb, for example.

In order to stabilize the operation of the ripple convertor 10b, it is only necessary that the slope (proportional to Vout) of the voltage VD during the time period during which the NMOS transistor 30 is off is similar to the slope (proportional to Vout/L) of the ripple voltage. Thus, for example, the voltage VD may be decreased from time t32 using the pulse signal generating circuit 65 instead of the pulse signal generating circuit 60. In the steady state, the amplitude of the slope voltage Vs is always smaller than the predetermined amplitude Vlim. Therefore, the amplitude of the slope voltage Vs is not limited.

<<In the Case of Transient Change of Load>>

Figure 13:
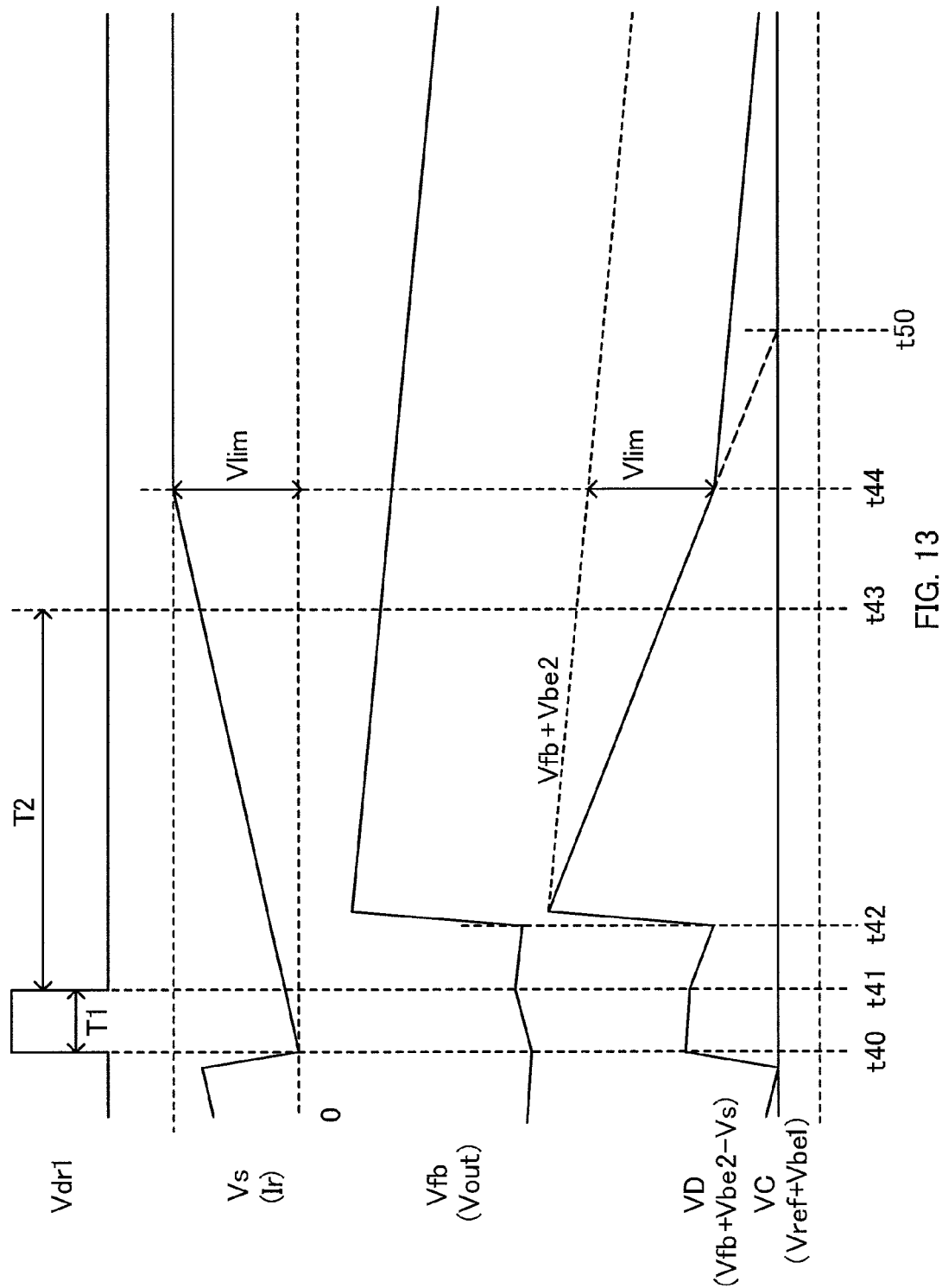
FIG. 13 is a diagram of a major waveform of a ripple converter 10b when a load 15 changes in condition in a transient manner.

A description will be given of the operation of the ripple convertor 10b in the case where the load 15 changes in condition in a transient manner from a heavy load to a light load, with reference to FIG. 13. In FIG. 13, it is assumed that the load 15 changes in condition in a transient manner at the timing of time t42, for example.

First, when the NMOS transistor 30 is turned on at time t40, the output voltage Vout increases, and therefore, the feedback voltage Vfb increases. On the other hand, the voltage VD somewhat decreases since the increasing slope voltage Vout is subtracted.

At time 41 when the predetermined time T1 has elapsed from time t40, the NMOS transistor 30 is turned off, and therefore the output voltage Vout decreases and the feedback voltage Vfb and the voltage VD also decrease.

At time t42, when the load 15 changes in condition in a transient manner from a heavy load to a light load, since an overshoot occurs in the output voltage Vout, thereby significantly increasing the feedback voltage Vfb and the voltage VD. Thus, even at time t43 when the predetermined T2 has elapsed from time t41, the voltage VD does not become equal in level to the voltage VC.

At time t44, since the slope voltage Vs reaches the predetermined amplitude Vlim, the slope voltage Vs is clamped. Therefore, the voltage VD decreases in a slow manner similarly to the feedback voltage Vfb. Thereafter, when the voltage VD decreases with decrease in the feedback voltage Vfb and becomes equal in level to the voltage VC (not shown), the NMOS transistor 30 is turned on again.

For example, if the slope voltage Vs is not limited to the predetermined amplitude Vlim, the voltage VD continues to decrease as indicated by a dashed line. In such a case, the voltage VD becomes equal in level to the voltage VC at time t50, for example, and the NMOS transistor 30 is turned on. In other words, the NMOS transistor 30 is turned on at such timing that the overshot output voltage Vout is not sufficiently decreased. However, in the ripple convertor 10b, the amplitude of the slope voltage Vs is limited, so as to delay the timing of turning on of the NMOS transistor 30. Therefore, as compared to the case where the amplitude of the slope voltage Vs is not limited, a deviation of the output voltage Vout from the target level can be decreased.

Third Embodiment

Figure 14:
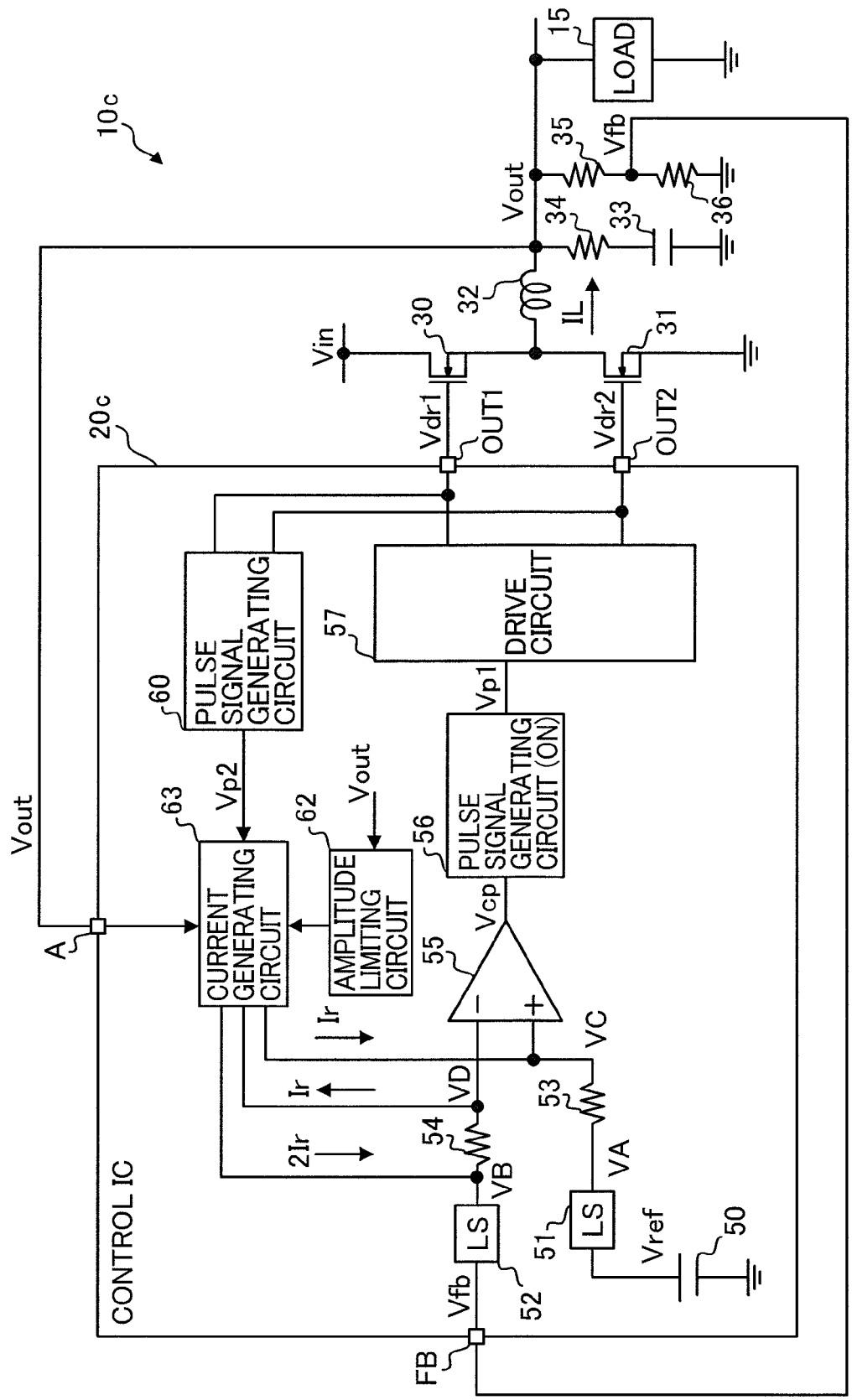
FIG. 14 is a diagram of a configuration of a ripple convertor 10c according to a third embodiment of the present invention.

FIG. 14 depicts a configuration of a ripple converter 10c of the fixed-on-time system according to a third embodiment of the present invention.

In the ripple converter 10c, in order to operate the ripple converter 10c in a stable manner, a slope voltage changing with the slope corresponding to the level of the output voltage Vout is added to both the reference voltage Vref and the feedback voltage Vfb. When comparing a control IC 20c of FIG. 14 and the control IC 20b of FIG. 10, they are the same except that the current Ir is supplied from the current generating circuit 63 to the node at which the resistor 53 and the non-inverting input terminal of the comparator 55 are connected. Such a configuration that the current Ir is supplied to the node at which the resistor 53 and the non-inverting input terminal of the comparator 55 are connected is similar to that in the case illustrated in FIG. 1.

Thus, the voltage VC is expressed by the above-described Equation (1), and the voltage VD is expressed by the above-described Equation (15).

$$VC = VA + Ir \times R = Vref + Vbe1 + I \times R \quad (1)$$

$$VD = VB - Ir \times R = Vfb + Vbe2 - Ir \times R \quad (15)$$

That is to say, the voltage VC increases with the slope proportional to the level of the output voltage Vout and the voltage VD decreases with the slope proportional to the level of the output voltage Vout, each time the pulse signal Vp2 changes from high to low.

Figure 7:
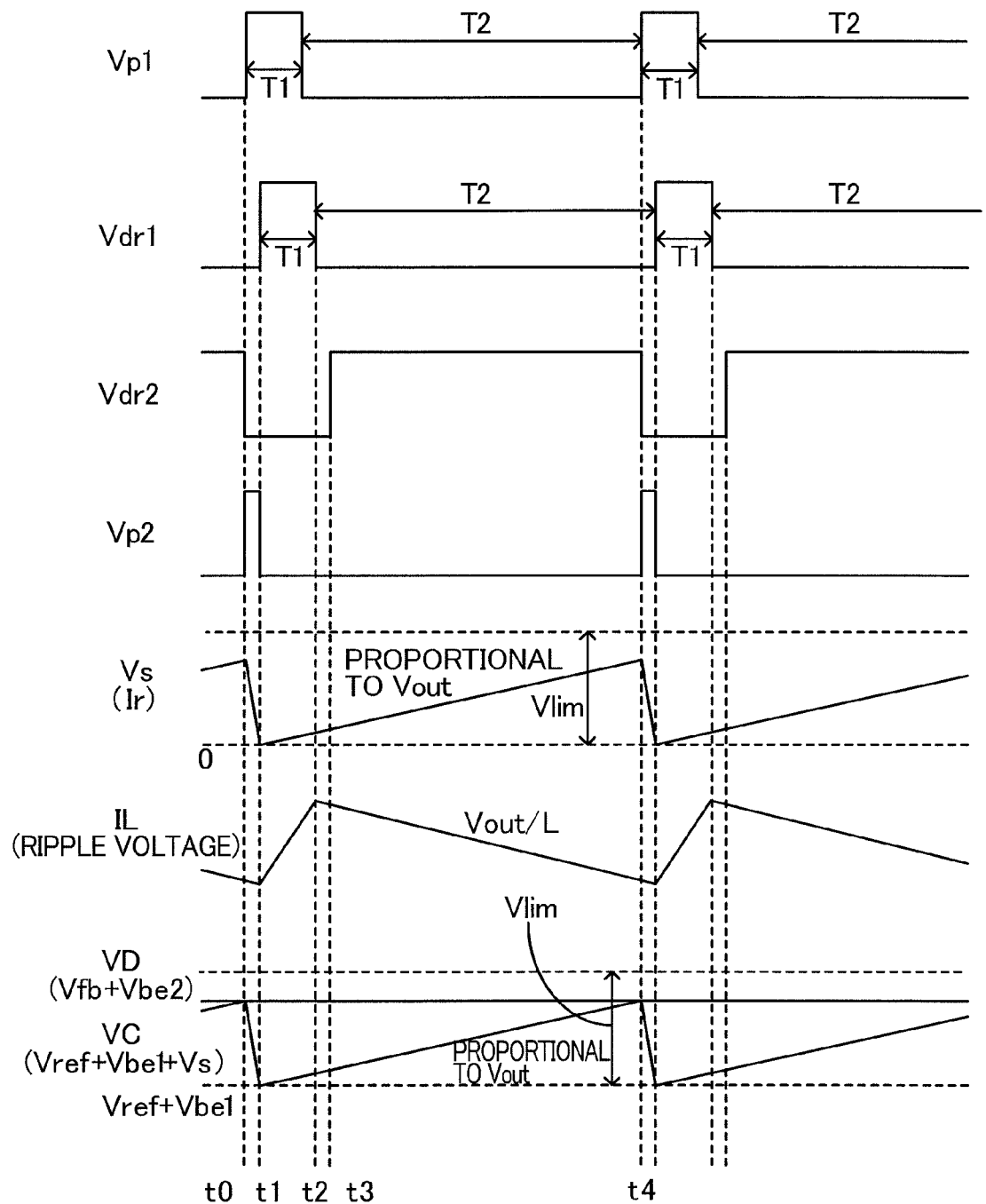
FIG. 7 is a diagram of a major waveform of a ripple converter 10a in a steady state.
Figure 12:
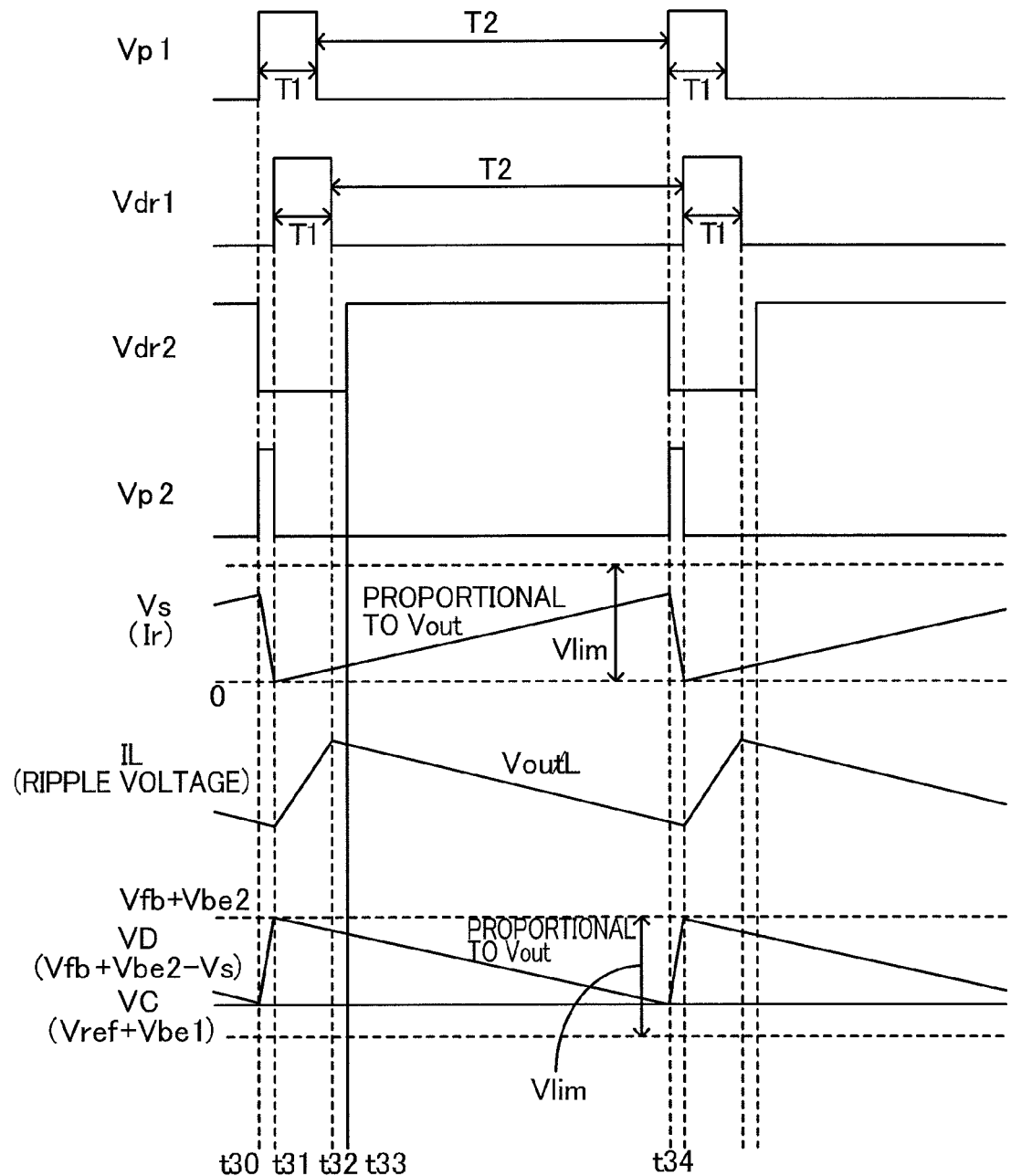
FIG. 12 is a diagram of a major waveform of a ripple converter 10b in a steady state.
Figure 15:
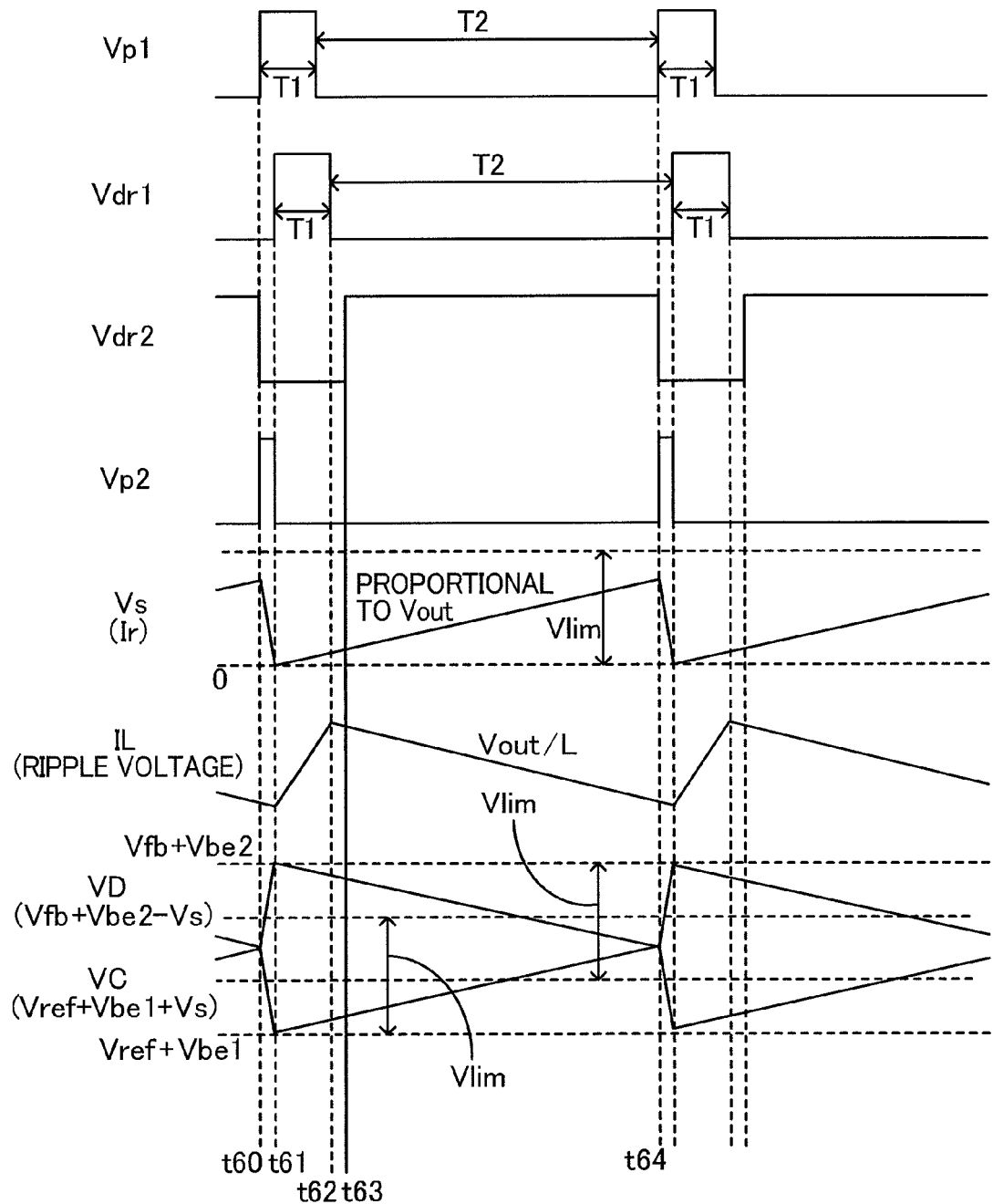
FIG. 15 is a diagram of a major waveform of a ripple converter 10c in a steady state.
Figure 16:
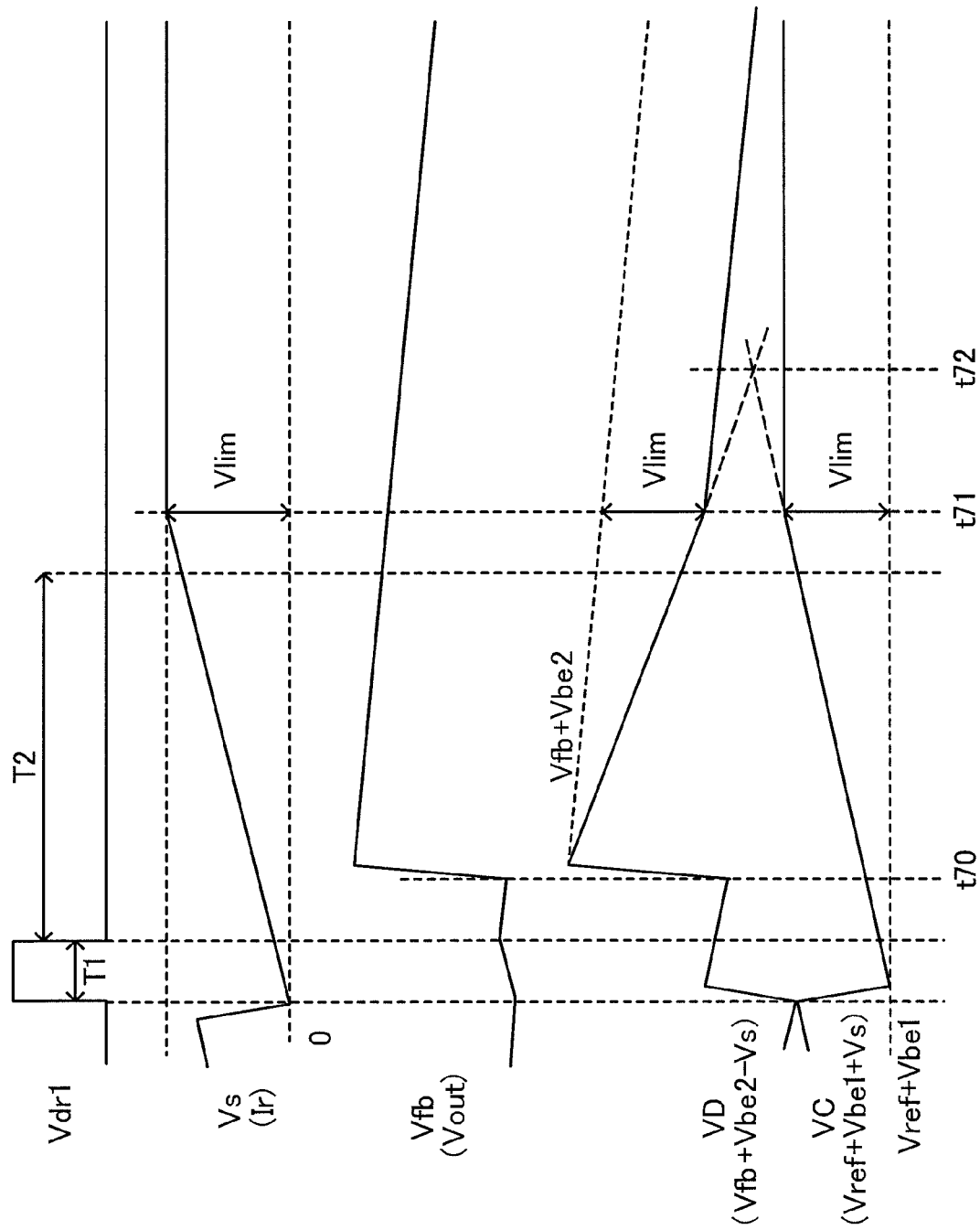
FIG. 16 is a diagram of a major waveform of a ripple converter 10c when a load 15 changes in condition in a transient manner.

Therefore, in the steady state, as illustrated in FIG. 15, the ripple computer 10c operates similarly to the ripple converters 10a and 10b illustrated in FIGS. 7 and 12. In FIG. 15, the slopes (proportional to Vout) of the voltages VC and VD during the time period during which the NMOS transistor 30 is off are similar to the slope (proportional to Vout/L) of the ripple voltage. Thus, the ripple converter 10c operates in a stable manner similarly to the ripple converter 10a, etc.

If the load 15 changes in condition in a transient manner from a heavy load to a light load as well, the ripple converter 10c operates as described in FIG. 15 similarly to the ripple converters 10a and 10b illustrated in FIGS. 8 and 13. Specifically, after the transient change in the load 15 occurs at time t70 and an overshoot occurs in the output voltage Vout, the slope voltage Vs is clamped at time t71. For example, if the slope voltage Vs is not clamped, the NMOS transistor 30 is turned on at time t72 when the overshot output voltage Vout is not sufficiently decreased. However, in an embodiment of the present invention, the slope voltage Vs is limited to the amplitude Vlim, thereby being able to delay the timing of turning on of the NMOS transistor 30 in the case where the overshoot occurs in the output voltage Vout.

A voltage Ir×R in Equation (1) corresponds to a first slope voltage, and the voltage (−Ir)×R in Equation (15) corresponds to a second slope voltage. The current generating circuit 63 and the resistor 53 correspond to a first voltage generating circuit, and the current generating circuit 63 and the resistor 54 correspond to a second voltage generating circuit. Further, the level shift circuit 51 and the resistor 53 correspond to a first adding circuit, and the level shift circuit 52 and the resistor 54 correspond to a second adding circuit.

Fourth Embodiment

Figure 17:
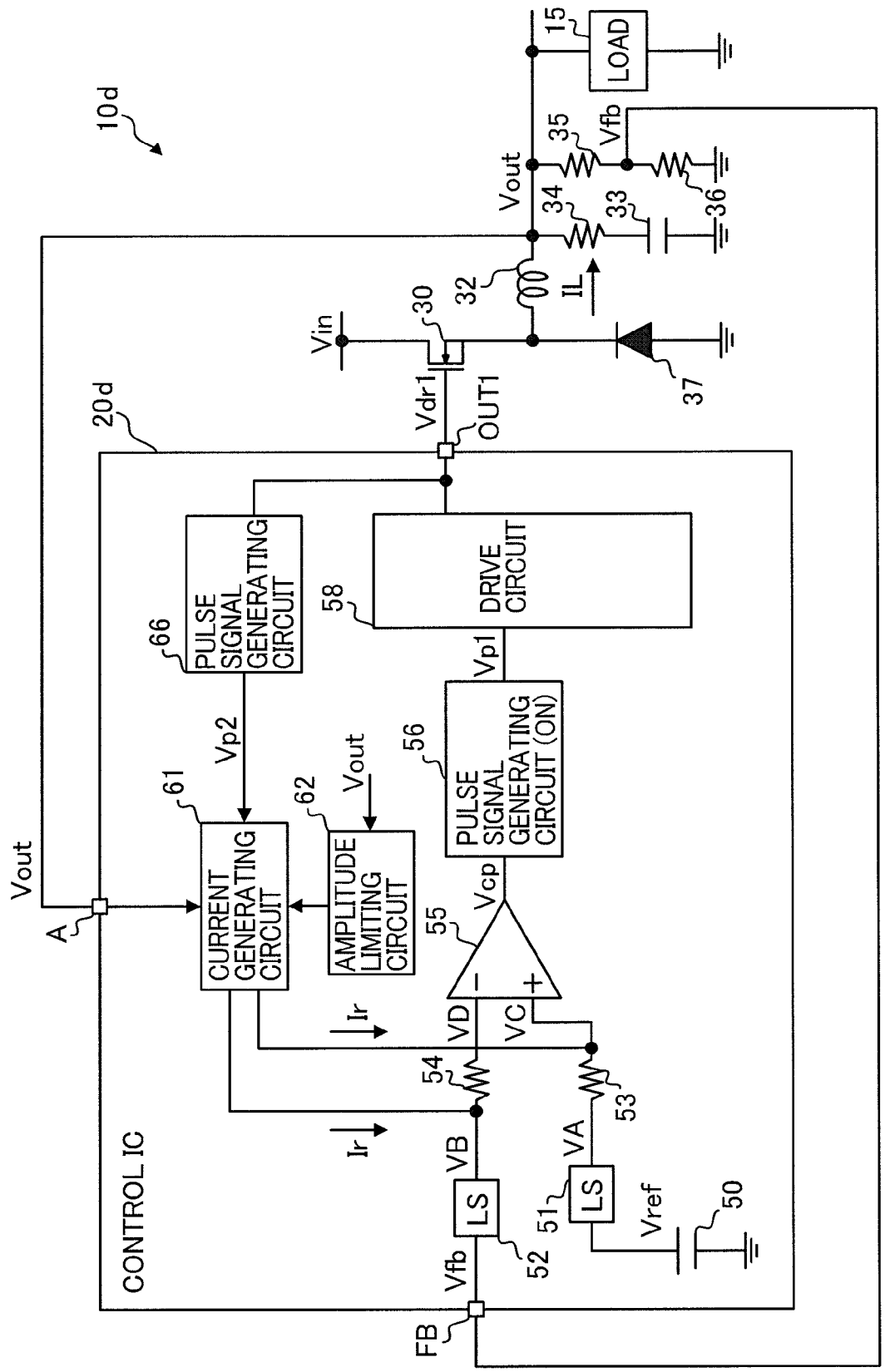
FIG. 17 is a diagram of a configuration of a ripple convertor 10d according to a fourth embodiment of the present invention.

FIG. 17 depicts a configuration of a ripple converter 10d of the fixed-on-time system according to a fourth embodiment of the present invention.

The ripple converter 10d is a ripple converter of a so-called diode rectification type and includes a diode 37 in place of the NMOS transistor 31. When comparing a control IC 20d of FIG. 17 and the control IC 20a of FIG. 1, they are different in a drive circuit 58 and a pulse signal generating circuit 66.

The drive circuit 58 is configured to turn on the NMOS transistor 30 and keep it on while the pulse signal Vp1 is high, and the pulse signal generating circuit 66 is configured to output the high-level pulse signal Vp2 when the NMOS transistor 30 is turned on. The ripple converter 10d with such a configuration also operates similarly to the ripple converter 10a, for example. Therefore, if a transient change occurs in the load 15, a deviation of the output voltage Vout from the target level can be suppressed.

In common ripple converters of the diode rectification type, if a load is in a light load condition or no-load condition, the output voltage may increase. However, the ripple converter 10d can suppress increase in the output voltage Vout even if the load 15 is in alight load condition (or no-load condition).

Figure 18:
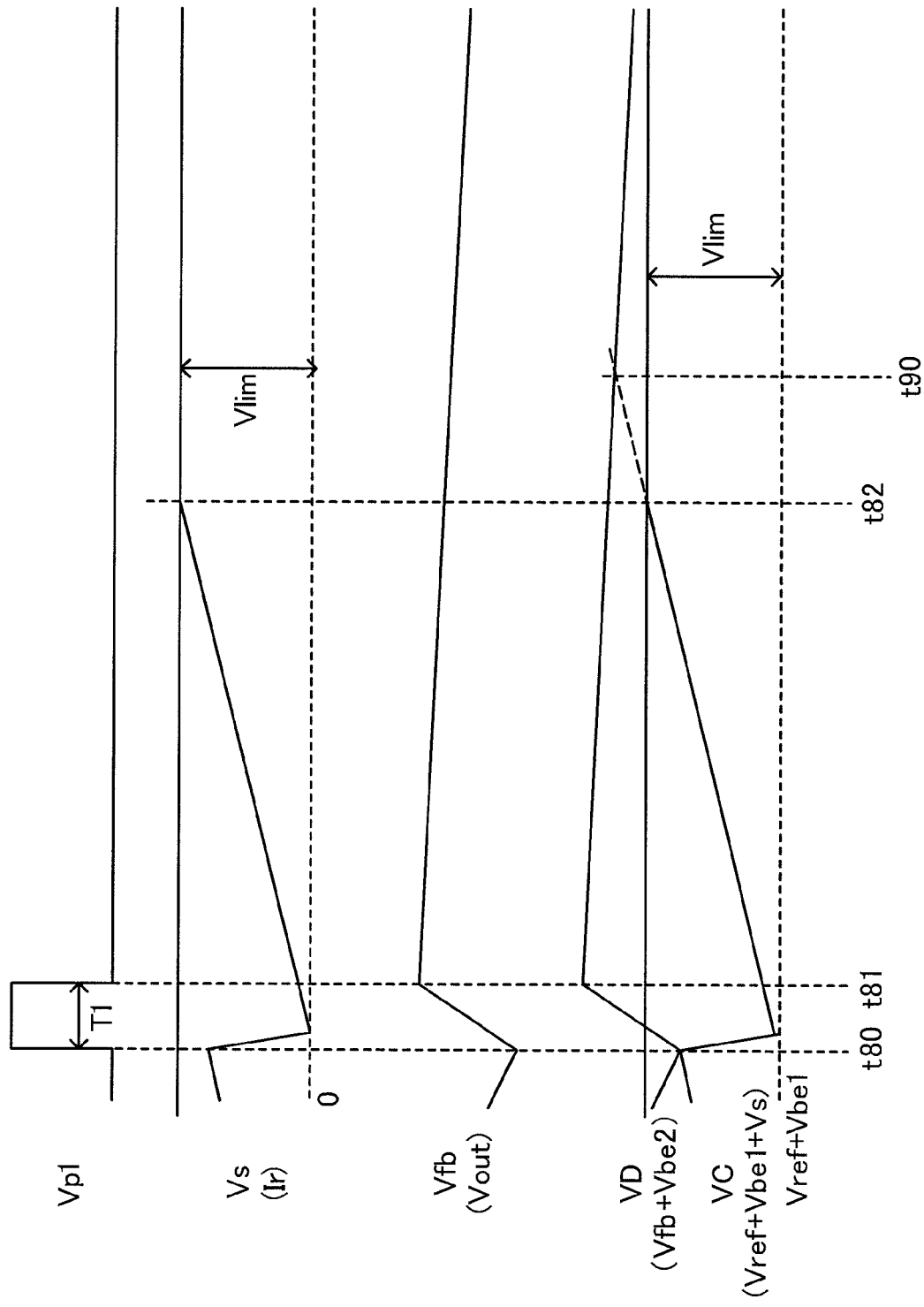
FIG. 18 is a diagram of a major waveform of a ripple converter 10d when a load 15 is in a light load condition.
Figure 19:
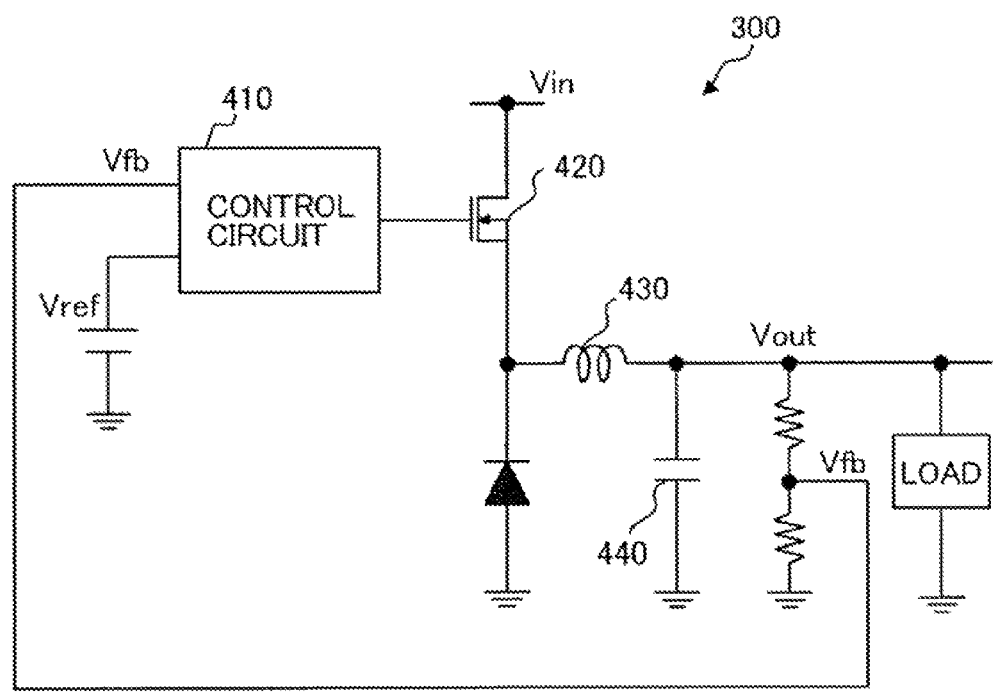
FIG. 19 is a diagram illustrating a common ripple converter 300
Figure 20:
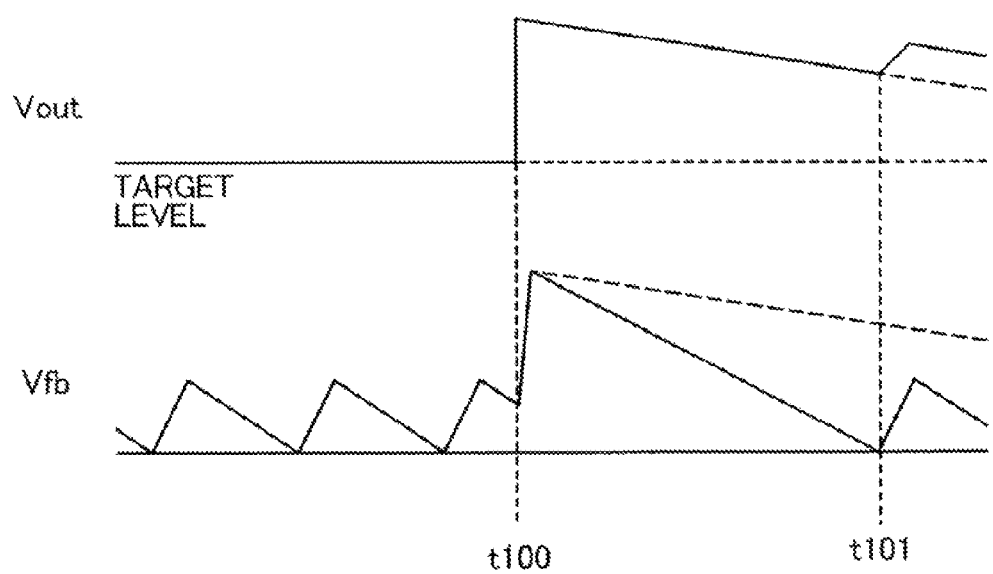
FIG. 20 is a diagram for explaining an operation of a ripple converter 300 when a load changes in condition in a transient manner.

FIG. 18 depicts major waveforms of the ripple converter 10d when the load 15 is in a light load condition. For example, when the NMOS transistor 30 is turned on at time t80, the output voltage Vout increases, and therefore, the feedback voltage Vfb and the voltage VD increase. When the NMOS transistor 30 is turned off at time t81, the output voltage Vout, the feedback voltage Vfb, and the voltage VD slowly decrease.

At time t82, since the slope voltage Vs reaches the predetermined amplitude Vlim, the slope voltage Vs is clamped, thereby clamping the voltage VC. Thereafter, the voltage VD decreases with decrease in the feedback voltage Vfb, and when the voltage VD becomes equal in level to the voltage VC (not shown), the NMOS transistor 30 is turned on again.

For example, if the slope voltage Vs is not limited to the predetermined amplitude Vlim, the voltage VC continues to increase as indicated by a dashed line. In such a case, the voltage VD becomes equal in level to the voltage VC at time t90, for example, and the NMOS transistor 30 is turned on. In other words, the NMOS transistor 30 is turned on at such timing that the output voltage Vout is not sufficiently decreased.

However, in the ripple convertor 10d, the amplitude of the slope voltage Vs is limited, so as to delay the timing of turning on of the NMOS transistor 30. Therefore, as compared to the case where the amplitude of the slope voltage Vs is not limited, a deviation of the output voltage Vout from the target level can be decreased.

Hereinabove, the ripple converters 10a to 10d each according to an embodiment of the present invention have been described.

In common ripple converters of the fixed-on-time system, if the output voltage Vout increases higher than the target level and is required to be decreased, for example, it is necessary to elongate a switching period. However, in general, since a ripple voltage with amplitude that significantly changes is added to a feedback voltage etc., the switching period cannot be extended and thus the output voltage is significantly deviated from the target level. In an embodiment of the present invention, the amplitude of the slope voltage Vs is limited to the predetermined amplitude Vlim. Therefore, in the ripple converter 10a, when the output voltage Vout increases, the switching period can be extended, as compared to common ripple converters. Therefore, the ripple converter 10a can suppress the deviation of the output voltage Vout from the target level, thereby generating the accurate output voltage Vout of the target level.

For example, in a common ripple converter, the ripple voltage generated based on the inductor current IL may be added to the feedback current. Even in such a case, the effect similar to that in an embodiment of the present invention can be acquired by limiting the amplitude of the ripple voltage. However, in general, an external component, etc., are required to be used for detecting the inductor current IL. Further, since external components tend to be affected by noise, the operation of the ripple converter may be destabilized. The control IC 20a generates the slope voltage Vs based on the output voltage Vout. Therefore, the use of the control IC 20a enables such a configuration of the ripple converter 10a that has external components smaller in number and is less affected by noise.

As expressed by Equation (13), if a user sets a higher target level of the output voltage Vout, for example, the predetermined amplitude Vlim is increased. In other words, the clamp level is changed with the output voltage level Vout in an embodiment of the present invention. Therefore, the slope voltage Vs is not clamped in the steady state regardless of what level the target level is.

The slope of the slope voltage Vs can freely be set by adjusting the capacitance value C of the capacitor 91 and the current value of the bias current Ib1.

The slope voltage Vs may be added to either one voltage of the reference voltage Vref and the feedback voltage Vfb, however, if the slope voltage is significantly changed, the voltage VC or the voltage VD may exceed a so-called in-phase input voltage range of the comparator 55. In such a case, as illustrated in FIG. 14, for example, the slope voltage (Ir×R) may be added to the reference voltage Vref and the slope voltage (−Ir×R) is added to the feedback voltage Vfb, to change both the voltages VC and VD. By changing the voltages VC and the voltages VD, the voltages VC and VD become less likely to exceed the in-phase input voltage range of the comparator 55.

In an embodiment of the present invention, the resistors 100 to 102 are selected that have such temperature coefficients that the temperature variation in the bias current Ib1 is sufficiently reduced, and the resistors 98, 111 to 113 are selected that have such temperature coefficients that the temperature variation of the voltage V3 is sufficiently reduced. Thus, the temperature dependence of the amplitude Vlim can be reduced.

For example, the NMOS transistors 30 and 31 may be integrated into the control IC 20a. With such a switching power circuit including power transistors, an effect similar to that in an embodiment of the present invention can be acquired.

Although the source electrode of the NMOS transistor 31 is grounded to the ground GND, a negative voltage (−Vdd) may be applied instead of the ground GND, for example. In such a case, if the slope voltage during the period during which the NMOS transistor 31 is on is generated in accordance with the voltage level of Vin− (−Vdd), the ripple converter can accurately be controlled.

For example, when the slope voltage Vs is clamped, the voltage VC of the non-inverting input terminal of the comparator 55 may be clamped by Zener diode etc.

Further, for example, in such a case as well where the control IC 20*a* includes a control circuit configured to perform control so that the switching period (e.g., T1+T2) becomes constant based on the input voltage Vin and the output voltage Vout, an effect similar to that in an embodiment of the present invention can be acquired.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A switching control circuit configured to control a switching operation of a transistor so that the transistor is turned on and kept on for a predetermined time in order to generate an output voltage of a target level from an input voltage, the transistor having an input electrode applied with the input voltage and an output electrode connected to a load via an inductor, the switching control circuit comprising:
   a voltage generating circuit configured to generate a slope voltage in each switching period of the transistor, the slope voltage changing with a slope corresponding to a slope of a ripple voltage, the ripple voltage contained in the output voltage during a time period during which the transistor is off;
   an amplitude limiting circuit configured to limit an amplitude of the slope voltage so as not to exceed a predetermined amplitude, the predetermined amplitude being greater than the amplitude of the slope voltage when the output voltage of the target level is generated, wherein the amplitude limiting circuit is configured to limit the amplitude of the slope voltage so as not to exceed the predetermined amplitude, and wherein the predetermined amplitude increases with an increase in level of the output voltage;
   an adding circuit configured to add the slope voltage to a reference voltage or a feedback voltage, the reference voltage indicating a reference of the output voltage of the target level, the feedback voltage corresponding to the output voltage; and
   a drive circuit configured to turn on the transistor to be kept on for a predetermined time and thereafter turn off the transistor, when a level of either one voltage, added with the slope voltage, of the reference voltage and the feedback voltage reaches a level of an other voltage thereof.

2. The switching control circuit of claim 1, wherein the voltage generating circuit is configured to generate the slope voltage based on the output voltage in each switching period of the transistor.

3. The switching control circuit of claim 1, wherein the voltage generating circuit includes:
   a charging/discharging circuit configured to charge a capacitor with a current corresponding to the output voltage, after the capacitor is discharged, in each switching period;
   a level shift circuit configured to shift a level of the charging voltage of the capacitor; and
   a slope voltage generating circuit configured to generate the slope voltage whose amplitude increases with an increase in level of a voltage outputted from the level shift circuit, wherein the amplitude limiting circuit includes a clamping circuit configured to clamp the voltage outputted from the level shift circuit so as not to increase the level of the voltage outputted from the level shift circuit, when the level of the charging voltage of the capacitor increases with an increase in the level of the output voltage and reaches a predetermined level corresponding to the predetermined amplitude.

4. A switching control circuit for a ripple converter of a fixed-on-time power conversion system comprising:
   a voltage generating circuit configured to generate a first voltage in each switching period of a transistor, the transistor providing a current through an inductor when conductive to increase an output voltage, the first voltage changing with a slope corresponding to a slope of a ripple voltage, the ripple voltage contained in the output voltage during a time period during which the transistor is off;
   a level shift circuit for forming a second voltage in response to the first voltage;
   an amplitude limiting circuit configured to limit an amplitude of the second voltage so as not to exceed a predetermined amplitude, the predetermined amplitude being greater than the amplitude of a slope voltage when the output voltage is at a target level;
   a converting circuit configured to form the slope voltage in response to the second voltage and to add the slope voltage to a reference voltage or a feedback voltage, the reference voltage indicating a reference of the output voltage of the target level, the feedback voltage corresponding to the output voltage; and
   a drive voltage generating circuit configured to turn on the transistor to be kept on for a predetermined time and thereafter turn off the transistor, when a level of either one voltage, added with the slope voltage, of the reference voltage and the feedback voltage reaches a level of an other voltage thereof.

5. The switching control circuit of claim 4, wherein the voltage generating circuit is configured to generate the slope voltage based on the output voltage in each switching period of the transistor.

6. The switching control circuit of claim 4, wherein the voltage generating circuit comprises:
   a bias current generating circuit for generating a bias current;
   a capacitor having a first terminal for receiving the bias current and forming the first voltage thereon, and a second terminal coupled to a reference voltage terminal; and
   a switch for coupling the first terminal of the capacitor to the reference voltage terminal in response to a pulse signal.

7. The switching control circuit of claim 4, wherein the level shift circuit comprises:
   a current source having an output; and
   a transistor having a first current electrode coupled to the output of the current source and forming the second voltage, a control electrode for receiving the first voltage, and a second current electrode coupled to a reference voltage terminal.

8. The switching control circuit of claim 4, wherein the amplitude limiting circuit comprises:
   a bias current generating circuit for generating a bias current;
   a resistor having a first terminal for receiving the bias current, and a second terminal coupled to a reference voltage terminal; and
   a transistor having a first current electrode coupled to the output of the level shift circuit, a control electrode coupled to the first terminal of the resistor, and a second current electrode coupled to the reference voltage terminal.

9. The switching control circuit of claim 4, wherein the converting circuit comprises:
- a voltage/current converting circuit for providing a first current to a first node in response to the second voltage; and
- a first resistor having a first terminal for receiving a voltage proportional to the reference voltage, a second terminal coupled to the first node and to the drive voltage generating circuit.

10. The switching control circuit of claim 9, wherein:
- the voltage/current converting circuit further provides a second current to a second node in response to the second voltage; and
- the converting circuit further comprises a second resistor having a first terminal coupled to the second node for receiving a voltage proportional to the feedback voltage, and a second terminal coupled to the drive voltage generating circuit.

11. The switching control circuit of claim 4, wherein the drive voltage generating circuit comprises:
- a comparator for comparing the reference voltage and the feedback voltage as selectively modified by the converting circuit to provide a compare signal in response thereto;
- a pulse signal generating circuit for generating a pulse of a predetermined duration in response to the compare signal being in a predetermined logic state; and
- a drive circuit for providing a drive signal to a control electrode of the transistor in response to the pulse of the predetermined duration.

12. The switching control circuit of claim 4, wherein the voltage generating circuit, the level shift circuit, the amplitude limiting circuit, the converting circuit, and the drive voltage generating circuit are combined on a single integrated circuit chip.

13. A method comprising:
- generating a first voltage in each switching period of a transistor, the transistor providing a load current through an inductor when conductive to increase an output voltage, the first voltage changing with a slope corresponding to a slope of a ripple voltage, the ripple voltage contained in the output voltage during a time period during which the transistor is off;
- forming a second voltage in response to the first voltage;
- limiting an amplitude of the second voltage so as not to exceed a predetermined amplitude, the predetermined amplitude being greater than the amplitude of a slope voltage when the output voltage is at a target level;
- forming the slope voltage in response to the second voltage;
- adding the slope voltage to a reference voltage or a feedback voltage, the reference voltage indicating a reference of the output voltage of the target level, the feedback voltage corresponding to the output voltage; and
- driving the transistor on for a predetermined time and thereafter turning off the transistor, when a level of either one voltage, added with the slope voltage, of the reference voltage and the feedback voltage reaches a level of an other voltage thereof.

14. The method of claim 13 wherein said generating comprises:
- generating a bias current proportional to the output voltage;
- converting the bias current into the first voltage using a capacitor; and
- coupling a first terminal of the capacitor to a reference voltage terminal in response to a pulse signal.

15. The method of claim 13 wherein forming the second voltage in response to the first voltage comprises:
- level shifting the first voltage to form the second voltage.

16. The method of claim 13 wherein limiting the amplitude of the second voltage comprises:
- clamping the second voltage at a level corresponding to the output voltage.

17. The method of claim 13 wherein forming the slope voltage and adding comprises:
- forming a current in response to the second voltage; and
- mirroring the current to an output terminal coupled to a resistor.

18. The method of claim 13 wherein adding the slope voltage to the reference voltage or the feedback voltage comprises:
- adding the slope voltage to the reference voltage and the feedback voltage.

19. The method of claim 13 wherein adding the slope voltage to the reference voltage or the feedback voltage comprises:
- adding the slope voltage to the reference voltage so as to increase a level of a voltage acquired by adding the slope voltage to the reference voltage, the reference voltage indicating a reference of the output voltage of the target level.

20. The method of claim 13 wherein adding the slope voltage to the reference voltage or the feedback voltage comprises:
- adding the slope voltage to the feedback voltage so as to decrease a level of a voltage acquired by adding the slope voltage to the feedback voltage, the feedback voltage corresponding to the output voltage.

* * * * *

UNITED STATES PATENT AND TRADEMARK OFFICE
CERTIFICATE OF CORRECTION

| | |
|---|---|
| PATENT NO. | : 8,742,742 B2 |
| APPLICATION NO. | : 13/313090 |
| DATED | : June 3, 2014 |
| INVENTOR(S) | : Seki |

Page 1 of 1

It is certified that error appears in the above-identified patent and that said Letters Patent is hereby corrected as shown below:

In the Specification

Column 14, line 31, equation 1, replace "VC=VA+Ir×R=Vref+Vbe1+I×R" with "VC=VA+Ir×R=Vref+Vbe1+Ir×R".

Column 15, line 28, replace "alight" with "a light".

Signed and Sealed this
Twenty-third Day of September, 2014

Michelle K. Lee
*Deputy Director of the United States Patent and Trademark Office*